US006862795B2

(12) United States Patent
Mahon

(10) Patent No.: US 6,862,795 B2
(45) Date of Patent: Mar. 8, 2005

(54) METHOD OF MANUFACTURING OF A MONOLITHIC SILICON ACCELERATION SENSOR

(75) Inventor: Geoffrey L. Mahon, Ridgewood, NJ (US)

(73) Assignee: VTY Holding Oy, Vantaa (FI)

(*) Notice: Subject to any disclaimer, the term of this patent is extended or adjusted under 35 U.S.C. 154(b) by 337 days.

(21) Appl. No.: 10/171,994

(22) Filed: Jun. 17, 2002

(65) Prior Publication Data

US 2003/0229981 A1 Dec. 18, 2003

(51) Int. Cl.[7] .................................................. G01R 3/00
(52) U.S. Cl. ..................... 29/595; 29/592.1; 73/514.32; 73/514.33; 73/514.36; 216/65; 451/5; 451/41
(58) Field of Search ........................... 29/592.1, 595; 73/514.32, 514.33, 514.36; 216/65; 451/5, 41

(56) References Cited

U.S. PATENT DOCUMENTS

| | | | |
|---|---|---|---|
| 4,574,327 A | 3/1986 | Wilner | 361/283 |
| 4,930,043 A | 5/1990 | Wiegand | 361/283 |
| 5,008,774 A | 4/1991 | Bullis et al. | 361/283 |
| 5,065,628 A | 11/1991 | Benecke | 73/517 R |
| 5,374,564 A | 12/1994 | Bruel | 437/24 |
| 5,503,285 A * | 4/1996 | Warren | 216/2 |
| 5,559,290 A * | 9/1996 | Suzuki et al. | 73/514.36 |
| 5,561,248 A * | 10/1996 | Negoro | 73/514.32 |
| 5,616,844 A * | 4/1997 | Suzuki et al. | 73/514.32 |
| 6,122,965 A | 9/2000 | Seidel et al. | 73/514.36 |

FOREIGN PATENT DOCUMENTS

| | | | |
|---|---|---|---|
| DE | 93 20 965 U 1 | 7/1995 | |
| DE | 197 48 666 A 1 | 5/1999 | |
| DE | 100 55 081 A 1 | 5/2002 | |
| JP | 07183543 A * | 7/1995 | H01L/29/84 |

OTHER PUBLICATIONS

"MEMS inertial rate and acceleration sensor"; Hulsing, R.; Position Location and Navigation Symposium, IEEE 1998, Apr. 20–23, 1998; pp.:169–176.*

* cited by examiner

Primary Examiner—Paul D Kim
(74) Attorney, Agent, or Firm—Squire, Sanders & Dempsey L.L.P.

(57) ABSTRACT

A method of manufacturing a monolithic silicon acceleration sensor is disclosed. The monolithic silicon acceleration sensor includes one or more sensor cells, each sensor cell having an inertial mass positioned by beam members fixed to a silicon support structure. According to the method, a sandwiched etch-stop layer is formed. First sections of the inertia mass and beam members are also formed. In addition, a second section of the inertial mass is formed. Further, an inertial mass positioned by beam members fixed to a silicon support structure is formed. Also, a first cover plate structure is bonded to a first surface of the silicon support structure.

26 Claims, 12 Drawing Sheets

| DIRECTION OF ACCELERATION | DIRECTION OF INERTIAL MASS MOVEMENT | | | |
|---|---|---|---|---|
| | 310 | 320 | 330 | 340 |
| +X | −Z | − | +Z | − |
| −X | +Z | − | −Z | − |
| +Y | − | +Z | − | −Z |
| −Y | − | −Z | − | +Z |
| +Z | −Z | −Z | −Z | −Z |
| −Z | +Z | +Z | +Z | +Z |

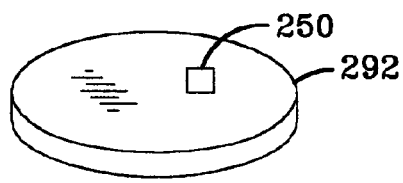
FIG-9
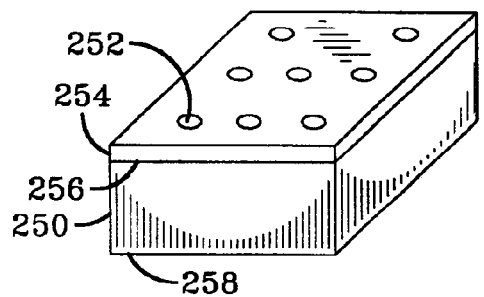
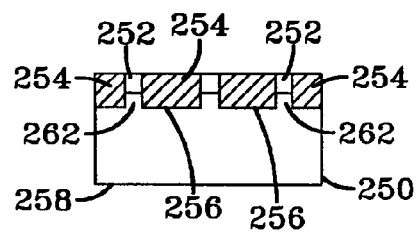
FIG-10A          FIG-10B
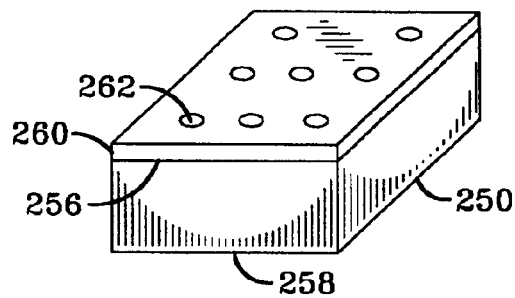
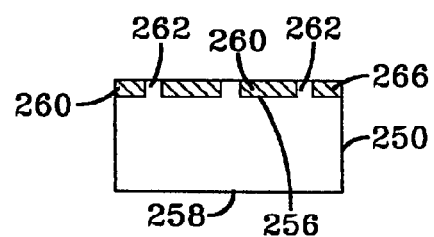
FIG-11A          FIG-11B

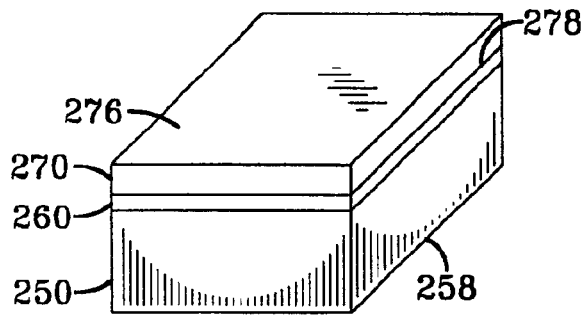
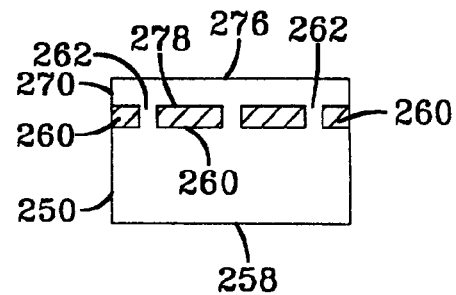
FIG-12A  FIG-12B
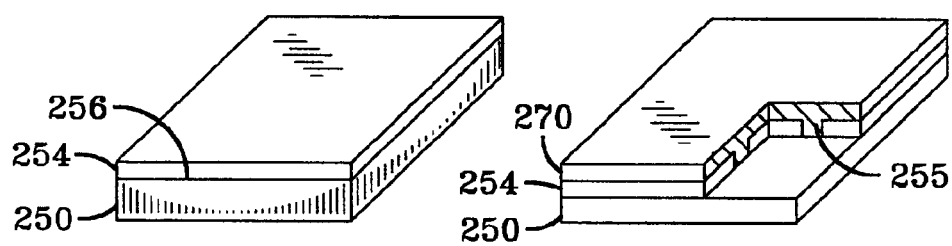
FIG-13A  FIG-13B
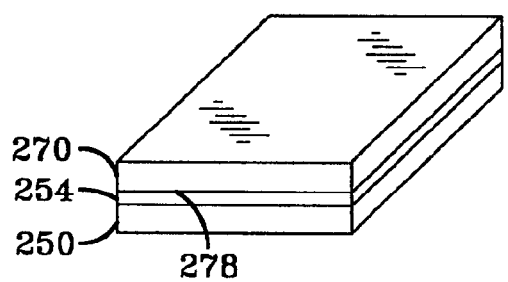
FIG-13C

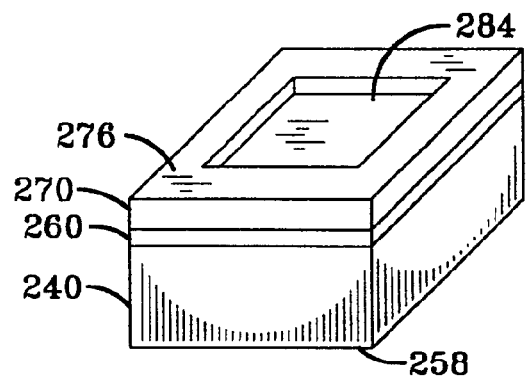
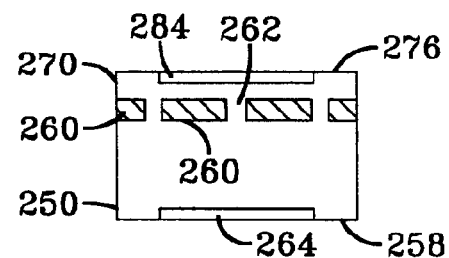
FIG-14A  FIG-14B
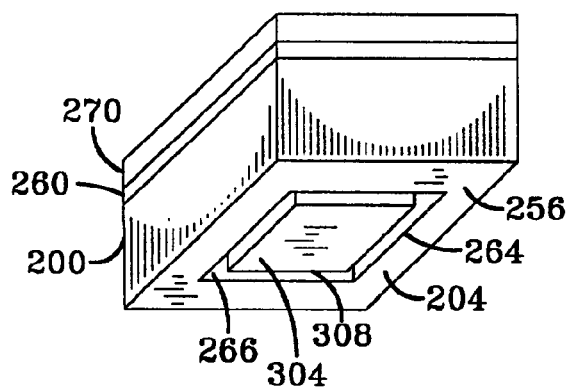
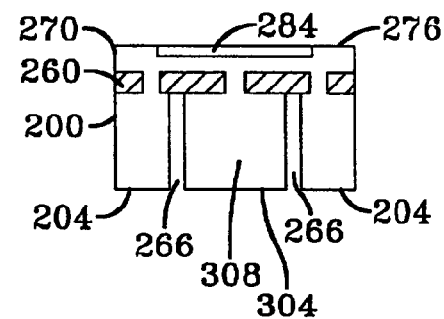
FIG-15A  FIG-15B

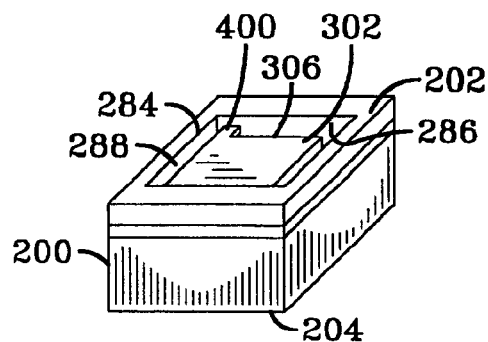
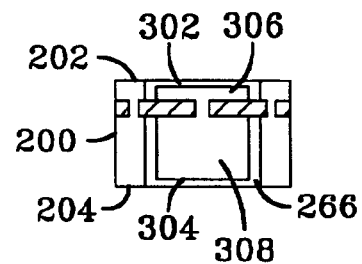
FIG-16A  FIG-16B
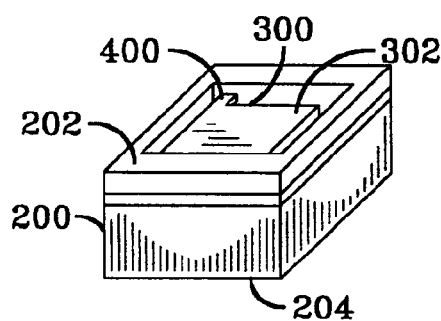
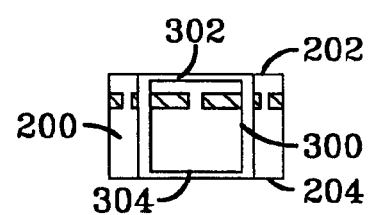
FIG-17A  FIG-17B

METHOD OF MANUFACTURING OF A MONOLITHIC SILICON ACCELERATION SENSOR

FIELD OF THE INVENTION

This invention relates to acceleration sensors micromachined from silicon and, more particularly, sensors having an inertial mass positioned by torsional or cantilever support members.

BACKGROUND OF THE INVENTION

It is known in the art that small compact acceleration sensors may be formed by micromachining silicon wafers into suitable configurations that are capable of detecting acceleration along one axis. The micromachining process is normally performed on batches of silicon wafers. This process consists of masking and forming patterns of etch stop material on a wafer surface, etching the exposed silicon, removing the etch stop material, metallizing, and bonding. The silicon wafers are diced into individual acceleration sensor devices which are packaged and connected to suitable electronic circuitry to form accelerometers. Using these techniques, a two axis or three axis acceleration sensor requires two or three discrete diced devices, respectively, to be precisely mechanically aligned along two or three orthogonal axes of acceleration. Examples of acceleration sensors formed by a micromachining process are described in the following U.S. Pat. Nos. 4,574,327; 4,930,043; and 5,008,774.

Prior forms of silicon acceleration sensors employ an inertial mass which moves in response to acceleration, positioned by cantilever support members that may introduce an asymmetry that can result in an undesirable cross-axis sensitivity. To avoid this undesirable asymmetric effect, these devices are designed with flexible support members around the periphery of an inertial mass so that the response to acceleration is preferentially along an axis perpendicular to the plane of the inertial mass and the support members. To further limit the acceleration response to one axis, the support members are sometimes placed in the mid-plane of the inertial mass or symmetrically placed at the top and bottom surfaces of the inertial mass. The devices fabricated in this manner may exhibit wide parameter variations between devices. Furthermore, for multiple axes applications, multiple discrete devices must be precisely aligned mechanically to each axis of acceleration. Difficulties encountered in the fabrication include the accurate location of the mid-plane and precise alignment of multiple devices, making the fabrication process complex, slow and expensive.

For the foregoing reasons, there is a need for a monolithic multiple axes acceleration sensor micromachined from silicon by a relatively simple fabrication process that results in low mechanical stress, temperature stable devices with tight parameter tolerances between devices. It is desirable that any required multiple axes alignment be performed as a part of the lithographic process used in the device fabrication rather than require precise mechanical alignment of discrete devices after the dicing operation. It is further desirable that the fabrication process be adjustable on a batch basis, in order to produce devices with predetermined acceleration sensitivity, with batches ranging from low sensitivity devices to high sensitivity devices.

SUMMARY OF THE INVENTION

The present invention is directed to a low mechanical stress, temperature stable, monolithic multiple axes acceleration sensor with tight parameter tolerances between devices that is micromachined from silicon by a relatively simple fabrication process. Because the present monolithic multiple axes acceleration sensor may be aligned by the lithographic process used in device fabrication, the need for precise mechanical alignment of discrete sensor devices along orthogonal axes of acceleration is eliminated. The fabrication process of the present invention may be adjustable on a batch basis, in order to produce devices with predetermined acceleration sensitivity, with batches ranging from low sensitivity devices to high sensitivity devices.

Where prior forms of silicon acceleration sensors attempted to avoid asymmetric cross-axis sensitivity, the present invention exploits this cross-axis effect to enable fabrication of a monolithic multiple axes acceleration sensor. The present silicon acceleration sensor invention comprises one, two, three or four silicon acceleration sensor cells, where each sensor cell comprises a movable silicon inertial mass that moves in response to acceleration and is positioned by beam members coplanar with a first surface of the silicon inertial mass and fixed to a silicon support structure. A means is provided for detecting movement of the inertial mass or resulting flexure of the beam members due to acceleration of the inertial mass and the silicon support structure. The relative position of each inertial mass is at right angles to an adjacent inertial mass when viewing the first surface of each silicon mass, using the position of the beam members as angular reference. A silicon acceleration sensor device embodying the present invention having a single sensor cell comprising one movable silicon inertial mass can sense acceleration in two orthogonal axes but cannot distinguish between acceleration along one axis or the other. A device having two sensor cells, where each sensor cell comprises a movable silicon inertial mass positioned at a 180 degree angle to the inertial mass of the other sensor cell when viewing the first surfaces of the inertial masses using the beam members as an angular reference, can sense acceleration in two orthogonal axes and can distinguish between acceleration along both axes. A device having three sensor cells, where each sensor cell comprises a movable silicon inertial mass positioned at angles of 0, 90, and 180 degrees relative to each other when viewing the first surfaces of the inertial masses using the beam members as an angular reference, can sense acceleration along three orthogonal axes and can distinguish between acceleration along each of the three axes. A device having four sensor cells, where each sensor cell comprises a movable silicon inertial mass positioned at angles of 0, 90, 180, and 270 degrees relative to each other when viewing the first surfaces of the inertial masses using the beam members as an angular reference, can sense acceleration along three orthogonal axes and can distinguish between acceleration along each of the three axes. The device comprising four sensor cells is of a physically symmetrical geometry when viewing the first surface of each inertial mass, and provides the capability for cancellation of opposing direction non-linearities. Thus, multiple axes acceleration sensing is achievable with a single monolithic device that does not require precise mechanical alignment of multiple discrete single axis acceleration sensing devices. One means for detecting movement of the inertial mass is by measuring the capacitance between the first surface of the movable inertial mass and a first electrically conductive layer spaced from the first surface and fixed in reference to the supporting silicon structure; and by measuring the capacitance between a second surface of the movable inertial mass opposite the first surface and a second electrically conductive layer spaced from the second surface and fixed in reference to the supporting silicon structure. Another means for detecting movement of the inertial masses is by measuring the resistance of piezoresistive elements placed on the positioning beam members. The beam members may be either in a cantilever or torsion configuration. The shape of the inertial mass is generally described as being a rectangular parallelapiped in the preferred embodiment of the invention.

A method of manufacture of a silicon acceleration sensor device, having a single silicon acceleration sensor cell with an electrically conductive silicon movable inertial mass, comprises the forming of a layered sandwich of an etch-stop layer between a first wafer section of electrically conductive silicon and a second wafer section of electrically conductive silicon, the first wafer section of silicon having an exposed first surface and the second wafer section of silicon having an exposed second surface. A second section of the silicon inertial mass is formed by etching a rectangular frame-shaped channel in the second wafer section from the exposed second surface extending to the etch-stop layer. A first section of the silicon inertial mass is formed by etching a U-shaped channel and a bar-shaped channel in the first wafer section from the exposed first surface extending to the etch-stop layer, positioning the bar-shaped channel and the U-shaped channel in the first wafer section to be in horizontal alignment with, and of equal planar dimensions to the rectangular frame-shaped channel in the second wafer section. Means are provided to electrically connect the second section of the inertial mass to the first section of the inertial mass through the etch-stop layer or on the etched surface of the inertial mass. The silicon dioxide layer that is exposed by the etched frame-shaped channel, the etched U-shaped channel, and the etched bar-shaped channel is then stripped away, thereby creating a rectangular parallel piped-shaped movable silicon inertial mass positioned by beam members fixed to a silicon support structure. An alternative means of electrically connecting the second section of the inertial mass to the first section of the inertial mass is to deposit a layer of conductive polysilicon over the resulting etched and stripped structure. This deposition process could also be used where it is desired to use nonconductive silicon wafer sections. Means are provided to detect movement of the silicon inertial mass by fixing a first electrically conductive layer, spaced from the first surface of the inertial mass, relative to the silicon support structure for a first capacitance measurement between the first surface of the inertial mass and the first electrically conductive layer; and by fixing a second electrically conductive layer, spaced from the second surface of the inertial mass, relative to the silicon support structure for a second capacitance measurement between the second surface of the inertial mass and the second electrically conductive layer. These electrically conductive layers are preferably metallic in composition. Alternatively, means for detecting movement of the inertial mass may be provided by placing piezoresistive elements on the positioning beam members fixed to the silicon support structure, and measuring the change in resistance when the beam members are flexed or twisted.

In the preferred embodiment of a method of manufacture of a silicon acceleration sensor having at least one silicon acceleration sensor cell, the first section of the movable silicon inertial mass is formed by etching a U-shaped channel and a bar-shaped channel in the first layer of silicon from the exposed first surface extending to the silicon dioxide layer, positioning the bar-shaped channel and the U-shaped channel in the first layer of silicon to be in horizontal alignment with, and of equal planar dimensions to the rectangular frame-shaped channel in the second layer of silicon. The bar-shaped channel is positioned across the open top of the U-shaped channel, centered within the outside dimensions of the open top of the U-shaped channel, and extending in length to equal the entire outside width of the top of the U-shaped channel. The ends of the bar-shaped channel are spatially separated from the top of the U-shaped channel, so that the spatial separation results in a device with a silicon inertial mass positioned by torsion beam members.

Although the preferred embodiment of the invention uses a silicon dioxide layer as an etch-stop layer, there are alternative embodiments. These alternative embodiments include a layer of silicon nitride, a layer of doped silicon, and the depletion layer associated with the junction of two differently doped silicon sections.

In alternative embodiments of a method of manufacture of a silicon acceleration sensor having at least one silicon acceleration sensor cell, the first section of the movable silicon inertial mass is formed by etching a U-shaped channel and a bar-shaped channel in the first layer of silicon from the exposed first surface extending to the silicon dioxide layer, positioning the bar-shaped channel and the U-shaped channel in the first layer of silicon to be in horizontal alignment with, and of equal planar dimensions to the rectangular frame-shaped channel in the second layer of silicon. The bar-shaped channel is positioned across the open top of the U-shaped channel, centered within the inside dimension of the open top of the U-shaped channel, and extending in length to be less than the inside width of the top of the U-shaped channel. The ends of the bar-shaped channel are spatially separated from the inside top of the U-shaped channel, so that the spatial separation results in a device with a silicon inertial mass positioned by cantilever beam members.

A further embodiment of a method of manufacture of a silicon acceleration sensor having at least one silicon acceleration sensor cell is to vary the acceleration sensitivity by adjusting the thickness of the beam members by adjusting the thickness of the first silicon wafer section, by adjusting the width of the beam members by adjusting the spatial separation between the U-shaped channel and the bar-shaped channel, or by adjusting the length of the beam members by adjusting the width of the etched channels.

The method of manufacture of a device having two silicon acceleration sensor cells each comprising a movable silicon inertial mass is identical to the method of manufacture of a device having one silicon acceleration sensor cell comprising one movable silicon inertial mass, except that a second inertial mass is positioned lithographically and then physically at a 90, 180 or 270 (which is functionally the same as 90) degree angle to the first inertial mass when viewing the exposed first surface of the silicon masses, using the positioning beams as angular reference. The method of manufacture of a device having three silicon acceleration sensor cells, each sensor cell comprising a movable silicon inertial mass, is identical to the method of manufacture of a device having two silicon acceleration sensor cells, except that the third inertial mass is positioned lithographically and then physically at a 90 degree angle to the second inertial mass and at a 180 degree angle to the first inertial mass when viewing the exposed first surface of the silicon masses, using the positioning beams as angular reference. The method of manufacture of a device having four silicon acceleration sensor cells, each sensor cell having a movable silicon inertial mass, is identical to the method of manufacture of a device having three acceleration sensor cells, except that a fourth inertial mass is positioned lithographically and then physically at a 90 degree angle to the third inertial mass, at a 180 degree angle to the second inertial mass, and at a 270 degree angle to the first inertial mass when viewing the exposed first surface of the silicon masses, using the positioning beams as angular reference. In this manner, a monolithic multiple axes acceleration sensor is formed that does not require precise mechanical alignment of multiple discrete single-axis acceleration sensors.

BRIEF DESCRIPTION OF THE DRAWINGS

FIG. 9 illustrates a perspective view of a section of an electrically conductive silicon wafer.

FIG. 10A illustrates a perspective view of a second silicon wafer section having silicon nitride dots and a first silicon dioxide layer on one surface.

FIG. 10B illustrates a sectional view of a second silicon wafer section having silicon nitride dots and a first silicon dioxide layer on one surface.

FIG. 11A illustrates a perspective view of a second silicon wafer section having a second silicon dioxide layer interspersed with silicon mesas on one surface.

FIG. 11B illustrates a sectional view of a second silicon wafer section having a second silicon dioxide layer interspersed with silicon mesas on one surface.

FIG. 12A illustrates a perspective view of the wafer section shown in FIG. 9 with a first silicon wafer section bonded to the silicon dioxide layer and ground off.

FIG. 12B illustrates a sectional view of the wafer section shown in FIG. 9A with a first silicon wafer section bonded to the silicon dioxide layer and ground off.

FIG. 13A illustrates a perspective view of a layer of silicon dioxide grown on a silicon wafer section.

FIG. 13B illustrates a partially broken away perspective view of a sandwiched layer of silicon dioxide between silicon wafer sections formed by an alternative method of manufacture.

FIG. 13C illustrates a perspective view of a sandwiched layer of silicon dioxide between silicon wafer sections for forming an alternative method of manufacture.

FIG. 14A illustrates a perspective view of the layered sandwich shown in FIG. 12A with depressions formed in the first and second surfaces.

FIG. 14B illustrates a sectional view of the layered sandwich shown in FIG. 12B with depressions formed in the first and second surfaces.

FIG. 15A illustrates a perspective view of the formed second section of the inertial mass.

FIG. 15B illustrates a sectional view of the formed second section of the inertial mass.

FIG. 16A illustrates a perspective view of the formed second and first sections of the inertial mass.

FIG. 16B illustrates a sectional view of the formed second and first sections of the inertial mass.

FIG. 17A illustrates a perspective view of the formed inertial mass positioned by the beam members fixed to the silicon support structure.

FIG. 17B illustrates a sectional view of the formed inertial mass positioned by the beam members fixed to the silicon support structure.

DETAILED DESCRIPTION OF THE INVENTION

Figure 1A:
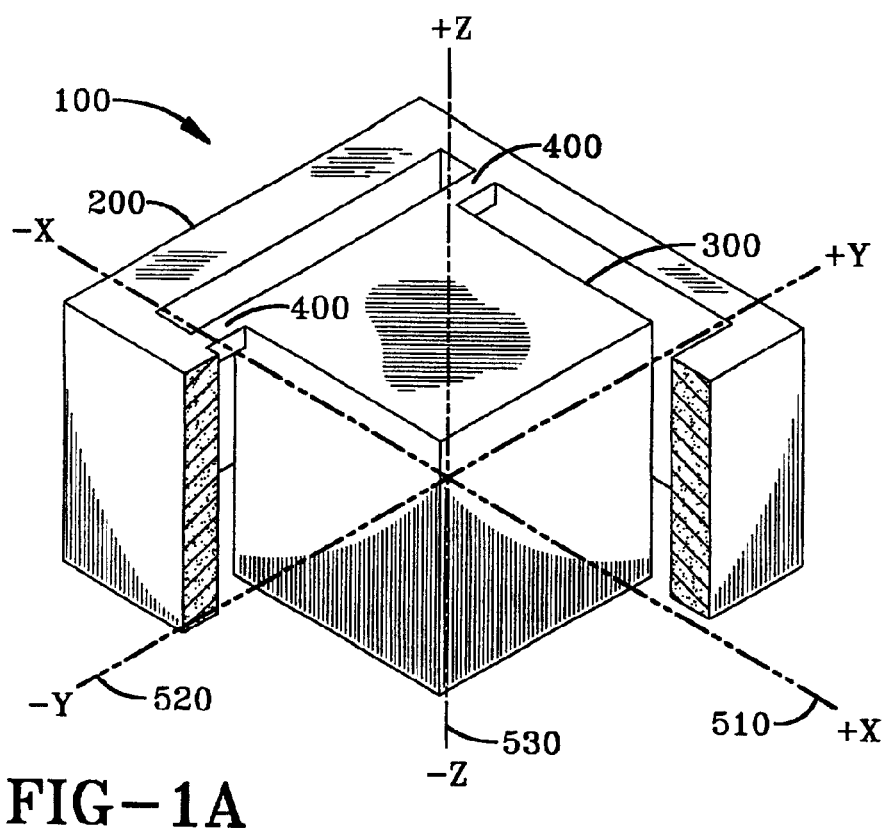
FIG. 1A illustrates a partially broken away perspective view showing part of a simplified monolithic silicon acceleration sensor comprising one silicon acceleration sensor cell without a first and a second cover plate structure, having an inertial mass positioned by torsional beams fixed to a silicon support structure.
Figure 1B:
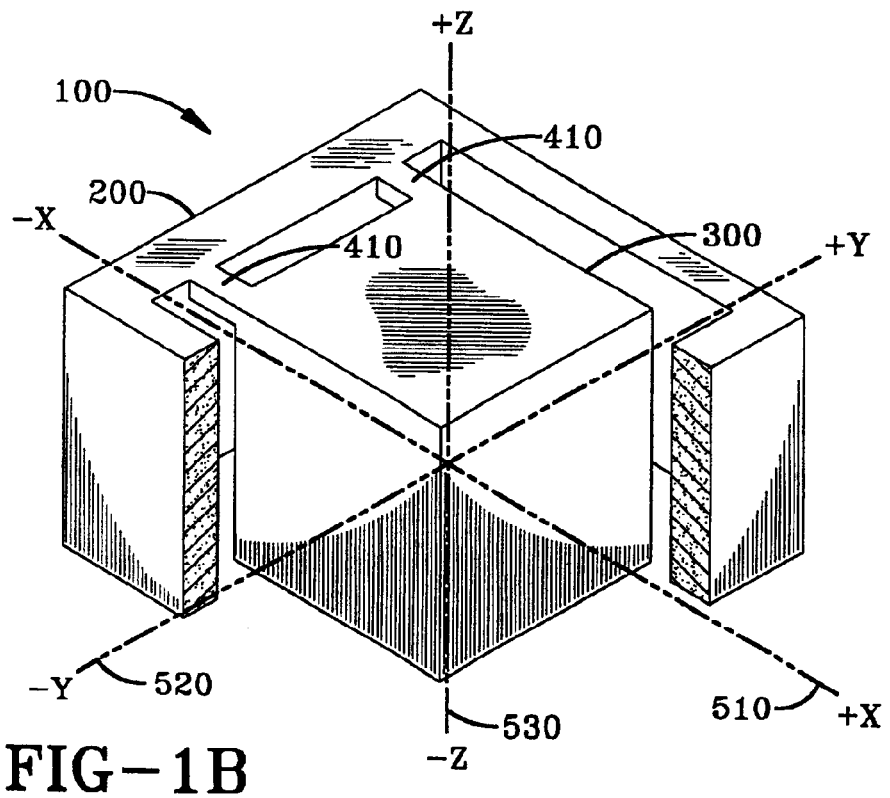
FIG. 1B illustrates a partially broken away perspective view showing part of a simplified monolithic silicon acceleration sensor comprising one silicon acceleration sensor cell without a first and a second cover plate structure, having an inertial mass positioned by cantilever beams fixed to a silicon support structure.

Referring now to FIG. 1A, there is shown part of a simplified monolithic silicon acceleration sensor 100 comprising one silicon acceleration sensor cell having an electrically conductive movable silicon inertial mass 300 positioned by torsion beam members 400 fixed to an electrically conductive silicon support structure 200, an X axis 510, a Y axis 520 and a Z axis 530. Similarly, FIG. 1B shows part of a simplified monolithic silicon acceleration sensor 100 comprising one silicon acceleration sensor cell having the electrically conductive moveable silicon inertial mass 300 positioned by cantilever beam members 410 fixed to the electrically conductive silicon support structure 200, the X axis 510, the Y axis 520 and the Z axis 530. Since the preferred embodiment of the present invention utilizes the torsion beam members 400 shown in FIG. 1A to position the movable silicon inertial mass 300, FIG. 1A will be used as a reference for the purposes of describing the operation of the present invention, but it should be understood that the discussion applies equally as well to the cantilever beam configuration of FIG. 1B. Considering acceleration relative to the Z axis 530, when the silicon acceleration sensor 100 is accelerated in the +Z direction along the Z axis 530, the inertial mass 300 will move in the −Z direction along the Z axis 530 relative to the silicon support structure 200, rotating about the axis formed by torsion beam members 400. Conversely, when the silicon acceleration sensor 100 is accelerated in the −Z direction along the Z axis 530, the inertial mass 300 will move in the +Z direction along the Z axis 530 relative to the silicon support structure 200, rotating about the axis formed by torsion beam members 400. Considering acceleration relative to the X axis 510, when the silicon acceleration sensor 100 is accelerated in the +X direction along the X axis 510, the inertial mass 300 will move in the −X direction along the X axis 510 relative to the silicon support structure 200, rotating about the axis formed by torsion beam members 400. Conversely, when the silicon acceleration sensor 100 is accelerated in the −X direction along the X axis 510, the inertial mass 300 will move in the +X direction along the X axis 510 relative to the silicon support structure 200, rotating about the axis formed by torsion beam members 400. Considering acceleration relative to the Y axis 520, when the acceleration sensor 100 is accelerated in either the +Y or −Y direction along the Y axis 520, the inertial mass 300 will be prevented from rotating about the axis formed by the torsion beam members 400 because the force on the inertial mass due to acceleration is not radial but rather in alignment to the axis formed by the torsion beam members 400. Thus, the silicon acceleration sensor configuration of FIG. 1A is capable of sensing acceleration along two orthogonal axis of acceleration, along the Z axis 530 and along the X axis 510, but cannot differentiate between these two axes of acceleration.

Figures 2, 3:
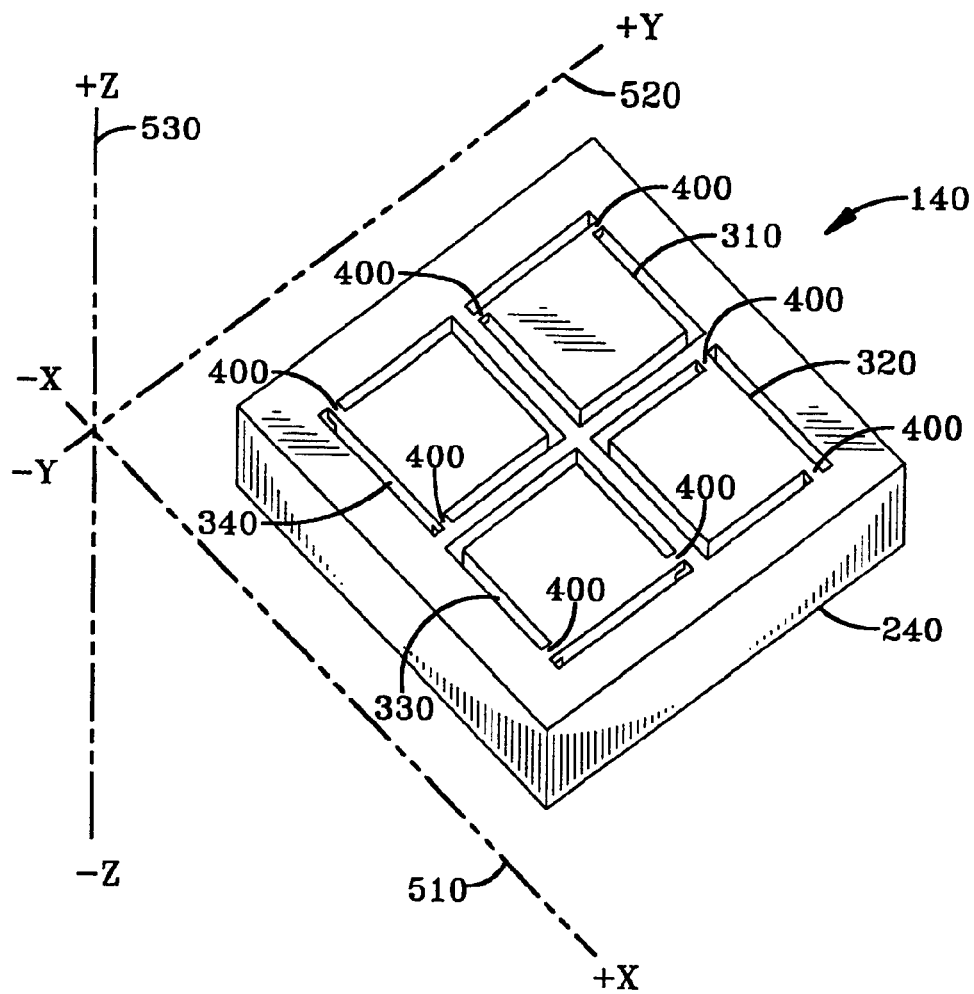
FIG. 2 illustrates a perspective view showing a simplified monolithic multiple axes acceleration sensor without a first cover plate structure and having four silicon acceleration sensor cells, each having an inertial mass oriented at a different angle when viewing the beam members in the plane of the X and Y axes, and each inertial mass positioned by torsional beam members fixed to a silicon support structure.
FIG. 3 shows a chart that indicates the direction of movement of each of the movable inertial masses shown in FIG. 2 due to acceleration of the acceleration sensor along the three orthogonal axes of acceleration.

Turning now to FIG. 2, there is shown part of a simplified monolithic multiple axes silicon acceleration sensor 140 comprising four silicon acceleration sensor cells, each having a movable silicon inertial mass 310, 320, 330, 340. A first cover plate structure is not shown in FIG. 2 in order to view the relative angular positioning of the inertial masses with reference to the beam members. Each of the four inertial masses is configured similarly to the movable silicon inertial mass 300 shown in FIG. 1A, being positioned by torsion beam members 400 fixed to a silicon support structure 240. However, only inertial mass 310 is oriented the same as inertial mass 300 shown in FIG. 1A, with respect to the orientation of the axis of rotation formed by the torsion beam members 400 in reference to the X axis 510 and the Y axis 520. Correspondingly, inertial mass 310 only responds to acceleration along the X axis 510 and the Z axis 530 by rotating about the axis formed by the torsion beam members 400, similarly to the inertial mass 300 of FIG. 1A. The direction of movement of inertial mass 310 resulting from the direction of acceleration along the three orthogonal axes of acceleration is shown in the column under the label _310_ in the chart of FIG. 3. By using a similar analysis to that used to determine movement of the inertial mass in FIG. 1A in response to acceleration of the acceleration sensor, the movement of inertial masses 320, 330, 340 may be readily determined. The direction of movement of the four inertial masses 310, 320, 330, 340 of the acceleration sensor 140 shown in FIG. 2 in response to acceleration along the X axis 510, the Y axis 520 and the Z axis 530 is indicated in the chart of FIG. 3.

Considering the chart of FIG. 3, acceleration of the acceleration sensor 140 of FIG. 2 in the +X direction results in the unique combination of movement of inertial mass 310 of FIG. 2 in the −Z direction, inertial mass 330 of FIG. 2 in the +Z direction, and no movement of inertial masses 320, 340 of FIG. 2. Conversely, acceleration of the acceleration sensor 140 of FIG. 2 in the −X direction results in the unique combination of movement of inertial mass 310 of FIG. 2 in the +Z direction, inertial mass 330 of FIG. 2 in the −Z direction, and no movement of inertial masses 320, 340 of FIG. 2. By similarly considering inertial mass movement in response to acceleration of the acceleration sensor 140 of FIG. 2 in the +Y, −Y, +Z, and −Z direction, it is seen from the results shown in FIG. 3 that there is a unique combination of movements of the four inertial masses for any combination of simultaneous acceleration magnitude and direction along one, two or all of the three orthogonal axes of acceleration. Thus, the acceleration sensor shown in FIG. 2 is capable of simultaneously sensing acceleration magnitude and direction along three orthogonal axes of acceleration including components resulting from off-axis acceleration. Also note that while FIG. 2 shows a configuration of four inertial masses symmetrically arranged that respond according to FIG. 3, it can be shown that only three inertial masses are needed to simultaneously distinguish acceleration direction and magnitude along one, two, or three of the orthogonal axes of acceleration, or any combination of off-axis components of acceleration.

Figure 4A:
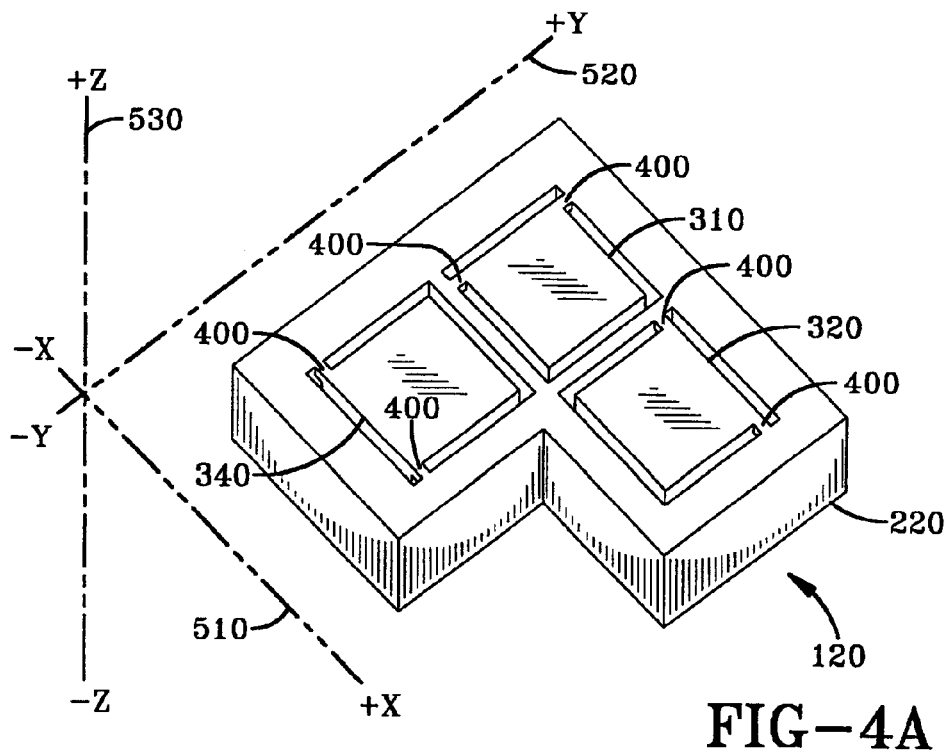
FIG. 4A and FIG. 4B illustrate two perspective views showing a simplified monolithic multiple axes acceleration sensor without a first cover plate structure and having three silicon acceleration sensor cells, each having an inertial mass oriented at a different angle when viewing the beam members in the plane of the X and Y axes, and each inertial mass positioned by torsion beam members fixed to a silicon support structure.
Figure 4B:
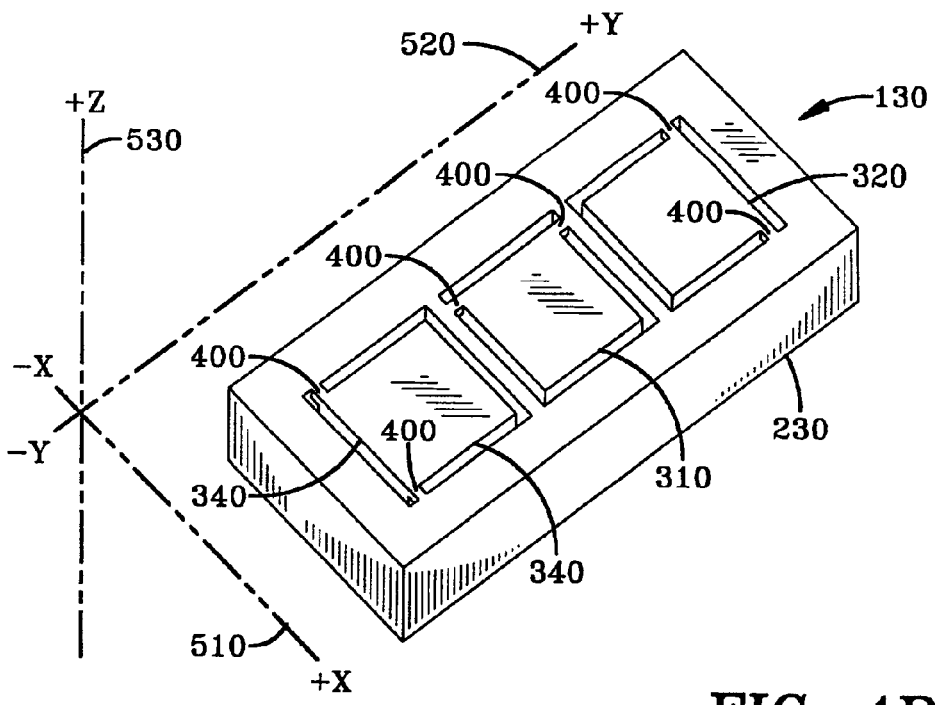

FIG. 4A shows one possible configuration of a simplified monolithic multiple axes silicon acceleration sensor 120 having three inertial masses 310, 320, 340 positioned by torsion beam members 400 fixed to a silicon support structure 220. FIG. 4B shows another possible configuration of a simplified multiple axes monolithic silicon acceleration sensor 130 having three inertial masses, 310, 320, 340, positioned by torsion beam members 400 fixed to a silicon support structure 230. The first cover plate structure is not shown in FIG. 4A and in FIG. 4B in order to view the relative angular positioning of the inertial masses with reference to the beam members.

Figure 5:
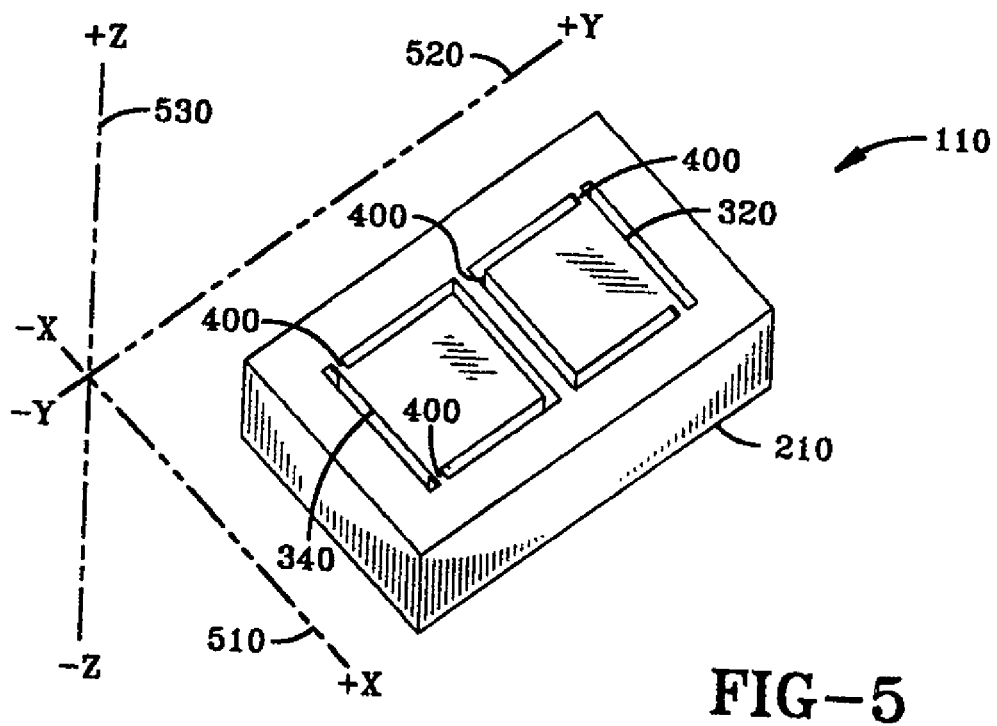
FIG. 5 illustrates a perspective view showing a simplified monolithic multiple axes acceleration sensor having two silicon acceleration sensor cells, each having an inertial mass oriented at a different angle when viewing the beam members in the plane of the X and Y axes, and each inertial mass positioned by torsional beam members fixed to a silicon support structure.

It can also be shown that only two inertial masses are required to simultaneously distinguish acceleration direction and magnitude along one or two orthogonal axes of acceleration, as well as off-axis components. FIG. 5 shows a possible configuration of a simplified monolithic silicon acceleration sensor 110 having two inertial masses 320, 340 positioned by torsion beam members 400 fixed to a silicon support structure 210. The first cover plate structure is not shown in FIG. 5 in order to view the relative angular positioning of the inertial masses with reference to the beam members.

Figure 6:
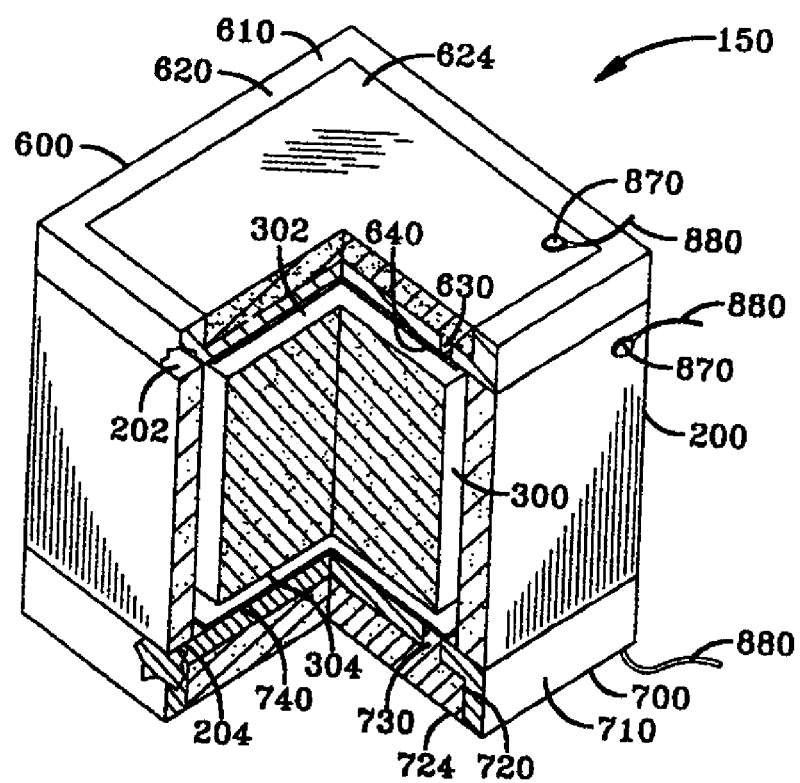
FIG. 6 illustrates a partially broken away perspective view of a monolithic silicon acceleration sensor comprising one silicon acceleration sensor cell.

Referring now to FIG. 6, FIG. 6 illustrates a partially broken away perspective which represents a view of a complete acceleration sensor that was partly shown in FIG. 1 without the cover structure. FIG. 6 illustrates a preferred embodiment of a single sensor cell version of the present invention by showing a partially broken away perspective view of a monolithic silicon acceleration sensor 150 comprising one silicon acceleration sensor cell. The sensor cell comprises an electrically conductive silicon movable silicon inertial mass 300 having a first surface 302 and an opposing second surface 304. The inertial mass 300 is positioned statically by electrically conductive torsion beam members, not shown in FIG. 6 but shown as torsion beam members 400 in FIG. 1A. The torsion beam members are fixed to the electrically conductive silicon support structure 200, silicon support structure 200 having a first surface 202 and an opposite second surface 204. A first cover plate structure 600 comprises a first metallic layer 640 spaced from the first surface 302 of the inertial mass 300, the first metallic layer 640 being formed on a first insulator 610, preferably glass, fixed to the first surface 202 of the silicon support structure 200. The first metallic layer 640 and the first surface 302 of the inertial mass 300 form a first variable capacitor of a value that depends on the position of the inertial mass 300. A second cover plate structure 700 comprises a second metallic layer 740 spaced from the second surface 304 of the inertial mass 300, the second metallic layer 740 being formed on a second insulator 710, preferably glass, fixed to the second surface 204 of the silicon support structure 200. The second metallic layer 740 and the second surface 304 of the inertial mass 300 form a second variable capacitor of a value that depends on the position of the inertial mass 300. The magnitude of the acceleration causing movement in the inertial mass 300 is indicated by measuring the magnitude of the difference between the first variable capacitor value and the second variable capacitor value. The preferred means of electrically connecting the inertial mass 300 to capacitive measuring circuitry is by connecting an electrical lead wire 880 to an electrical bonding pad 870 formed on an external surface of the electrically conductive silicon support structure 200 which is electrically connected to the electrically conductive inertial mass 300 through the electrically conductive beam members. The preferred means of electrically connecting the first metallic layer 640 of the first cover plate structure 600 to capacitive measuring circuitry is by a third electrically conductive silicon wafer section 620, having a second surface 624, mounted on the first insulator 610 and having a first conductive silicon mesa 630 through the first insulator 610 in electrical contact with the first metallic layer 640. The electrical lead wire 880 connected to the capacitive measuring circuitry is also connected to the electrical bonding pad 870 on the second surface 624 of the third silicon wafer section 620 thus completing the electrical connection to the first metallic layer 640. Similarly, the preferred means of electrically connecting the second metallic layer 740 of the second cover plate structure 700 to capacitive measuring circuitry is by a fourth electrically conductive silicon wafer section 720, having a second surface 724, mounted on the second insulator 710 and having a second conductive silicon mesa 730 through the second insulator 710 in electrical contact with the second metallic layer 740. The electrical lead wire 880 connected to the capacitive measuring circuitry is also connected to the electrical bonding pad 870 on the second surface 724 of the fourth silicon wafer section 720 thus completing the electrical connection to the second metallic layer 740. In this preferred embodiment of the present invention, the shape of the silicon inertial mass 300 is a rectangular parallelepiped, the first surface 302 of the inertial mass 300 being slightly depressed from the first surface 202 of the silicon support structure 200 to provide dielectric spacing for the first variable capacitor, and the second surface 304 of the inertial mass 300 being slightly depressed from the second surface 204 of the silicon support structure 200 to provide dielectric spacing for the second variable capacitor.

Figure 7:
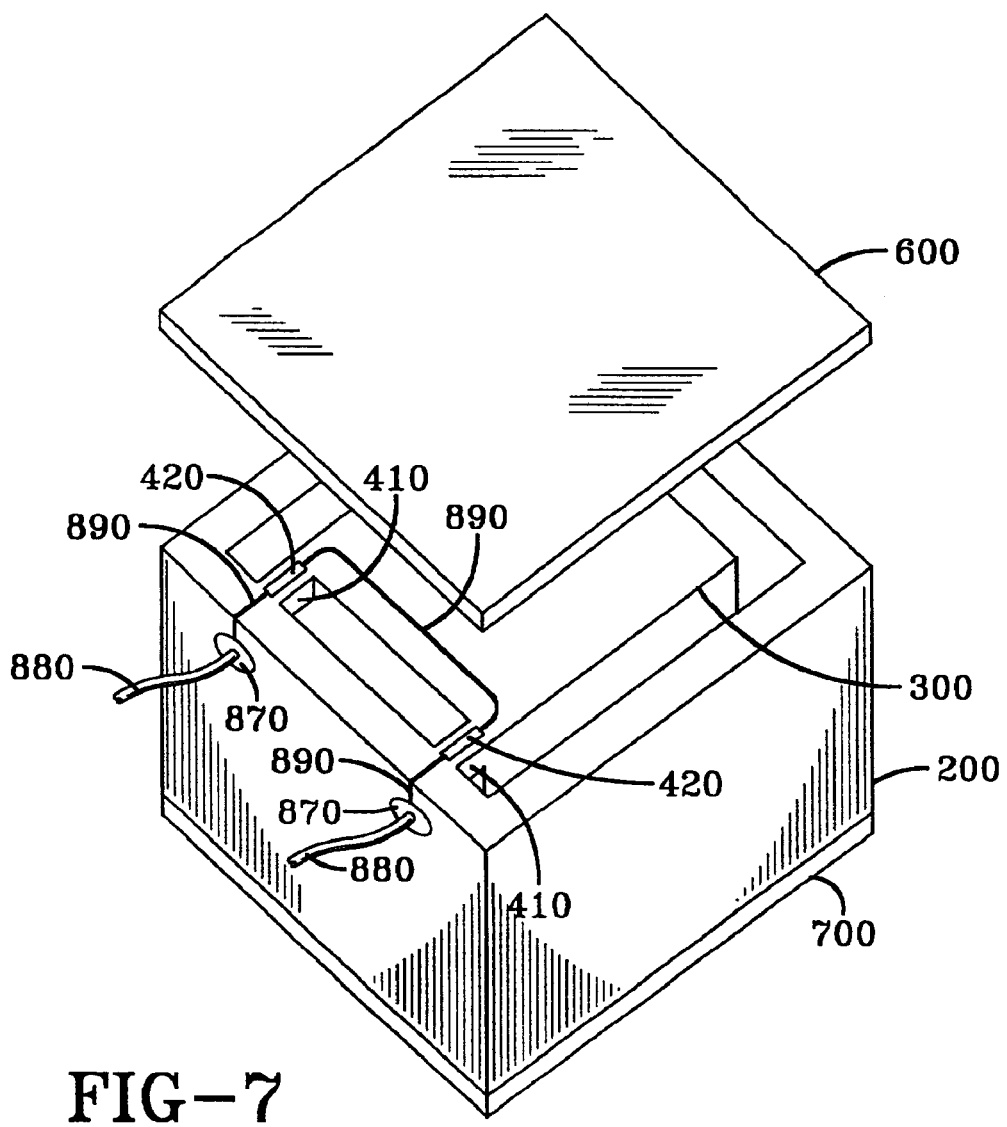
FIG. 7 illustrates a partially broken away perspective view showing a simplified electrically nonconductive single cell monolithic silicon acceleration sensor with piezoresistive elements on cantilever beam members.

Alternative embodiments to the present invention include the use of cantilever beams 410 shown in FIG. 1B to position the inertial mass 300 shown in FIG. 6. Another embodiment of the present invention is the forming of piezoresistive elements on the torsion beam members 400 shown in FIG. 1A or on the cantilever beam members 410 shown in FIG. 1B. FIG. 7 depicts a simplified single sensor cell embodiment of a silicon acceleration sensor 100 that illustrates a silicon inertial mass 300 is positioned by silicon cantilever beam members 410 that are fixed to a silicon support structure 200. Piezoresistive elements 420 are bonded to the beam members 410 and electrically connected in series to electrical bonding pads 870 via metallized interconnections 890. Bonding wires 880 connect these piezoresistive elements to resistance measuring circuitry to determine the level of bending in the beam members 410, giving a measure of the movement of the inertial mass 300, which is also a measure of the magnitude of the acceleration experienced by the inertial mass 300.

Figure 8:
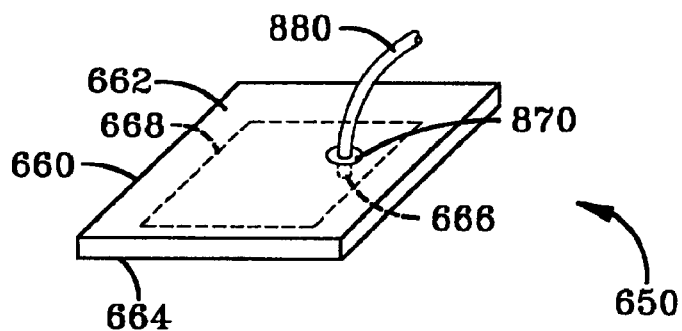
FIG. 8 depicts an alternative embodiment of a cover plate structure.

An alternative embodiment of electrically connecting the first metallic layer 640 of FIG. 6 to capacitive measuring circuitry is illustrated in FIG. 8 which shows an alternative cover plate structure 650. The alternative cover plate structure 650 comprises an alternative insulator 660 having a first surface 662 and an opposing second surface 664. A electrical bonding pad 870 is located on the first surface 662 and an alternative metallic layer 668 is located on the second surface 664 of the insulator 660. A metallized hole 666 is positioned in the insulator 660 connecting the metallic layer 668 to the bonding pad 870, and an electrical lead wire 880 bonded to the bonding pad 870 is connected to capacitive measuring circuitry. Two of these alternative structures form a first cover plate structure 600 and a second cover plate structure 700 shown in FIG. 6. Although the drawings show the inertial mass in the shape of a cube, it may be shaped as a rectangular parallelepiped in order to increase the sensor sensitivity by increasing the size of the inertial mass.

Typical dimensions for some components of FIG. 2 may be as follows: each cube-shaped inertial mass 310, 320, 330, 340 has sides of between about 300 microns to about 400 microns; the beam members 400 have a thickness of between about 5 microns to about 10 microns; the spacing between the inertial masses 310, 320, 330, 340, and the support structure 240, known as the channel width, is about 20 microns. A typical silicon acceleration sensor 110 having four inertial masses 310, 320, 330, 340 has sides of about 1200 microns. The typical dimensions given are intended to be illustrative of a typical embodiment only, and should not be construed as limitations on any physical parameters of the devices.

Typical dimensions for some components of FIG. 6 may be as follows: the thickness of the first insulator 610 is about 75 microns and the thickness of the second insulator 710 is about 75 microns. The spacing between the first surface 302 of the inertial mass 300 and the first cover plate structure 600 is about 1 micron. The spacing between the second surface 304 of the inertial mass 300 and the second cover plate structure is about 1 micron. The thickness of the first metallic layer 640 is about several angstroms and the thickness of the second metallic layer 740 is about several angstroms.

As discussed above, the configurations shown in FIG. 2, FIG. 4A, FIG. 4B, and FIG. 5, are monolithic silicon acceleration sensor devices having either four, three, or two acceleration sensor cells with the first cover plate structure removed in order to view the relative angular positioning of the inertial masses with reference to the beam members. The super-positioning of the structure shown in FIG. 6 onto the structure of the devices shown in FIG. 2, FIG. 4A, FIG. 4B, and FIG. 5 illustrates the complete structure of these monolithic devices.

Turning now to the method of manufacture of the monolithic silicon acceleration sensor, silicon micro machining technology is used in the fabrication of the exemplary sensor device 120 shown in FIG. 6, as well as the multiple sensor cell devices depicted in FIG. 2, FIG. 4A, FIG. 4B, and FIG. 5. A multiplicity of these devices will normally be batch fabricated using silicon wafers. The method of manufacture of the monolithic silicon acceleration sensor may be subdivided into the steps of (1) forming a layered sandwich of silicon dioxide between two layers of electrically conductive silicon, (2) fabricating movable silicon inertial masses, beam members, and silicon support structures, (3) fabricating first cover plate structures and second cover plate structures, and bonding the first and second cover plate structures to the silicon support structures, and (4) dicing the resulting structure into one, two, three, or four sensor cell devices, bonding electrical lead wires, and encapsulating the devices. Since step (4) uses methods that are conventional and well known in the art, it will not be necessary to provide a detailed description of these procedures. While the description that follows describes the method of manufacture of a monolithic silicon acceleration sensor device having a single sensor cell, it is understood by those skilled in the art that not only can a multiplicity of single sensor cell devices be batch fabricated concurrently, but a multiplicity of multiple sensor cell devices used for sensing acceleration along several axes can also be batch fabricated concurrently. The main distinguishing difference between the multiple sensor cells within a single device is the angular orientation with respect to each other sensor cell and the electrical connection configuration. Therefore, the following description is focused on the fabrication of a single sensor cell device, since once this is understood, it is more easily understood how a multiplicity of multiple sensor cell devices may be fabricated concurrently. Note that the dimensions in the description are typical for the preferred embodiment of the invention and are for illustrative purposes. The actual device dimensions will vary depending upon the desired device parameters.

The preferred embodiment of the present invention begins with the first step of forming a layered sandwich of silicon dioxide between a first layer of electrically conductive silicon having an exposed first surface and a second layer of electrically silicon having an exposed second surface, the first layer of silicon and the second layer of silicon being in electrical contact with each other. Consider FIG. 9 depicting a section 250 of an second electrically conductive silicon wafer 292 that is typically 400 microns thick. Note that there are also similar first wafer section, third wafer section, and fourth wafer section that are considered in subsequent fabrication steps. The second wafer section 250, depicted in FIG. 10A, is also typically 400 microns thick and has a first surface 256 and second surface 258 that are typically 600 microns square. The preferred method of fabricating the layered sandwich is by growing dots of silicon nitride 252 on the first surface 256 of the second wafer section 250 at locations that will not interfere with etching operations that will be performed in later fabrication steps. The first surface 256 of the second wafer section 250 is then thermally oxidized which causes a selective first silicon dioxide layer 254 to be grown at locations not covered by dots of silicon nitride 252. FIG. 10B shows a cross section of the second wafer section 250 of FIG. 10A having silicon mesas 262 resulting from the oxidation process. The first silicon dioxide layer 254 is then stripped off of the first surface 256 of the second wafer section 250, leaving a formed depression in the first surface 256 of the second wafer section 250, relative to the interface between the silicon and the silicon nitride dots 252. FIG. 11A and FIG. 11B depict the second wafer section 250 after a second silicon dioxide layer 260 is thermally grown in the formed depression in the second wafer section 250, extending to a level corresponding to the interface between the silicon and the silicon nitride dots 252 of FIG. 10B, and the silicon nitride dots 252 are stripped off. Thus, a planar surface is formed near the first surface 256 of the second wafer section 250 comprising the second silicon dioxide layer 260 interspersed with silicon mesas 262 as shown in FIG. 11A and FIG. 11B. FIG. 12A and FIG. 12B illustrate a first wafer section 270 of a second electrically conductive silicon wafer having first surface 276 and second surface 278 that are typically 600 microns square. This first wafer section 270 is bonded to the formed planar surface of the second wafer section 250, such that the second surface 278 of the first wafer section 270 is in contact with the formed planar surface. The first wafer section 270 is then ground off to a value that is typically between 5 and 10 microns. The value will determine the thickness of the beam members formed in a later step of fabrication. This results in a layered sandwich of silicon dioxide between a first silicon wafer section 270 and a second silicon wafer section 250 having a typical thickness of about 400 microns, whereby the first wafer section 270 and the second wafer section 250 are electrically interconnected through the silicon dioxide layer via the silicon mesas 262.

In addition to the preferred embodiment described above, there are several alternative embodiments of forming a sandwiched layer of silicon dioxide between two layers of silicon. One alternative embodiment to produce a structure similar to that shown in FIG. 12A and FIG. 12B is by implanting ions to a depth typically of 5 to 10 microns below the surface of the second silicon dioxide layer 260 of the second wafer section 250 shown in FIG. 11A and FIG. 11B, prior to bonding the first silicon wafer section 270 of FIG. 12A and FIG. 12B to the planar surface of the second silicon dioxide layer 260 on the second wafer section 250, as shown in FIGS. 12A and 12B. The first wafer section is not ground off, as above, but the resulting structure is thermally shocked. The thermal shock is such that the second wafer section 250 is caused to be cleaved along the junction of the ion implantation and the remaining silicon of the second wafer section 250, resulting in a structure that is inverted from the structure shown in FIG. 12A and FIG. 12B, in that the second wafer section 250 is typically between 5 and 10 microns thick and the first wafer section 270 is typically 400 microns thick. Another alternative embodiment to produce a structure similar to that in FIG. 12A and FIG. 12B is by growing a first layer of silicon dioxide 254 on the second wafer section 250, as shown in FIG. 13A, and then exposing several small areas 255 of the second wafer section 250 through the silicon dioxide layer 254, creating a puddle of molten silicon, and drawing the puddle of molten silicon onto the exposed surface of the first silicon dioxide layer 254, as shown in FIG. 13B. A first layer of silicon 270 is formed on top of the silicon dioxide layer 254 when the molten silicon cools as shown in FIG. 13B, resulting in a structure that is similar to FIG. 12A and FIG. 12B. Another alternative embodiment to produce a structure similar to FIG. 12A and FIG. 12B is forming a first layer of silicon dioxide 254 on the first surface 256 of the second wafer section 250 as shown in FIG. 13A. The second surface 278 of the first wafer section 270 is bonded to the first silicon dioxide layer 254 as shown in FIG. 13C. A multiplicity of small holes is exposed in either the first wafer section 270 or the second wafer section 250 extending to the silicon dioxide layer 254, stripping the exposed silicon dioxide layer 254, and depositing conductive polysilicon or other conductive material in the small holes. This results in forming electrical connections between the first wafer section 270 and the second wafer section 250.

The second step of the preferred embodiment is fabricating a movable silicon inertial mass 300, beam members 400, and a silicon support structure 200 as depicted in FIG. 1A. The layered sandwich of the silicon dioxide layer 260 between the first wafer section 270 and the second wafer section 250 shown in FIG. 12A and FIG. 12B forms the starting point for this second step. To provide space for movement of an inertial mass to be formed in subsequent steps, a first one micron depression 284 is formed on the first surface 276 of the first wafer section 270 and a second one micron depression 264 is formed on the second surface 258 of the second wafer section 250, as shown in FIG. 14A and FIG. 14B. Note that the second silicon dioxide layer 260 and the silicon mesas 262 shown in FIG. 14B were formed in a previous step of the fabrication process. The first depression 284 and the second depression 264 are formed by growing a first layer of silicon nitride on the exposed first surface 276 of the first wafer section 270 and a second layer of silicon nitride on the exposed second surface 258 of the second wafer section 250 shown in FIG. 14B. The first layer of silicon nitride and the second layer of silicon nitride are masked to provide a first and a second exposed rectangular area, for the first rectangular depression 284 and the second rectangular depression 264. The first and the second exposed rectangular areas are positioned to be in horizontal alignment with each other. The exposed first and second rectangular areas are then stripped of the silicon dioxide layer so that first and second rectangular areas of silicon are exposed on the first wafer section 270 and the second wafer section 250. Layers of silicon dioxide are grown on the exposed silicon in the first and second rectangular areas. The masking on the silicon nitride layers are removed and the silicon nitride and the silicon dioxide are stripped off, leaving a 1 micron depression on the first surface 276 of the first wafer section 270 and a 1 micron depression on the second surface 258 of the second wafer section 250 where the layers of silicon dioxide had been grown, as depicted in FIG. 14A and FIG. 14B.

A second section 308 of a movable silicon inertial mass is formed in the second wafer section 250 of FIG. 14B as shown in FIG. 15A and FIG. 15B by masking a rectangular frame-shaped area with a width of typically 20 microns within the periphery of the second depression 264 of FIG. 14B, the rectangular frame shaped area having a major and a minor dimension. A silicon dioxide layer is grown over the remaining exposed area of the second surface 258 of the second wafer section 250 shown in FIG. 14B and the frame-shaped masking is removed, exposing a frame-shaped area of silicon within the second depression 264 on the second surface 258 of the second wafer section 250 of FIG. 14B. The exposed silicon is etched, preferably resistive ion etched (RIE), from the exposed second surface 258 of FIG. 14B extending to the silicon dioxide layer 260 that forms an etch stop, creating a frame-shaped channel 266 in the second wafer section 250 of FIG. 14B, resulting in the silicon support structure 200 and the second section 308 of the inertial mass as shown in FIG. 15A and FIG. 15B. Within the channel 266 is the second section 308 of the inertial mass having a second surface 304 that was previously part of the second surface 258 of the second wafer section 250 of FIG. 14B. Outside the channel 266 is the silicon support structure 200 having a second surface 204 that was previously part of the second surface 258 of the second wafer section 250 of FIG. 14B. A first section 306 of the movable silicon inertial mass 300 of FIG. 1A and torsion beam members 400 are formed in the first wafer section 270 of FIG. 14B as shown in FIG. 16A and FIG. 16B by masking a U-shaped area and a bar-shaped area, each with a width of typically 20 microns, within the periphery of the first depression 284. The bar-shaped area has a long dimension that is aligned with the major dimension of the rectangular frame-shaped channel 266 shown in FIG. 15A and FIG. 15B. The U-shaped area and the bar-shaped area are positioned to be in horizontal alignment with, and of equal planar dimensions to the rectangular frame-shaped channel 266 of FIG. 15A previously formed in the second wafer section 250 of FIG. 14A. This alignment enables a rectangular parallel piped inertial mass to be formed after the subsequent etching process of the first section 306 inertial mass. A silicon dioxide layer is grown over the remaining exposed area of the first surface 276 of the first wafer section 270 of FIG. 14A, and the U-shaped and bar-shaped masking is removed, exposing a U-shaped and a bar-shaped area of silicon within the first depression 284 on the first surface 276 of the first wafer section 270 of FIG. 14A. The exposed silicon is etched, preferably RIE, from the exposed first surface 276 extending to the silicon dioxide layer 260 of FIG. 14A that forms an etch stop, creating a U-shaped channel 286 and a bar-shaped channel 288 in the first wafer section 250 of FIG. 14A, as shown in FIG. 16A and FIG. 16B. The interstitial silicon between the U-shaped channel 286 and the bar-shaped channel 288 form the torsion beam members 400. Within the U-shaped channel 286 and the bar-shaped channel 288 is the first section 306 of the inertial mass having a first surface 302 that was previously part of the first surface 276 of the first wafer section 270 shown in FIG. 14A. Outside the channels 286, 288 is the silicon support structure 200 having a first surface 202 that was previously part of the first surface 276 of the first wafer section 270 shown in FIG. 14A. The resulting structure shown on FIG. 16A and FIG. 16B is the inertial mass 300 of FIG. 1A held in place by a web of silicon dioxide and the torsion beam members 400 that are fixed to the silicon support structure 200. The inertial mass shown in FIG. 16B comprises the first section 306 that was part of the first wafer section 270 and the silicon dioxide layer 260 of FIG. 14B, and the second section 308 that was part of the second wafer section 250 of FIG. 14B. The silicon support structure 200 shown in FIG. 16B comprises part of the first wafer section 270, the silicon dioxide layer 260, and the second wafer section 250 of FIG. 14B.

The entire structure is stripped of exposed silicon dioxide in the etched frame-shaped channel 266, in the etched U-shaped channel 286, and in the etched bar-shaped channel 288 as shown in FIG. 16A and FIG. 16B, thereby creating a rectangular parallel piped-shaped inertial mass 300 having a first surface 302 and a second surface 304, positioned by torsion beam members 400 fixed to a silicon support structure 200 having a first surface 202 and a second surface 204, as shown in FIG. 17A and FIG. 17B. The stripping agent used is typically hydrogen fluoride.

Figure 18:
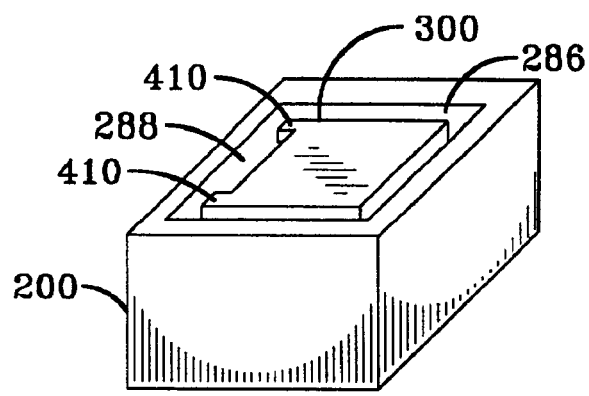
FIG. 18 illustrates a perspective view of a structure used to show the formation of cantilever beam members.

There are several alternatives to the preferred embodiment for fabricating the movable silicon inertial masses 300, beam members 400, and silicon support structures 200 shown in FIG. 17A and FIG. 17B. One of these alternatives include adjusting the thickness of the beam members 400 by adjusting the thickness of the first wafer section 270 of FIG. 14A, which may be accomplished by either epitaxially growing silicon onto the exposed first surface 276 of the first wafer section 270 or by ion milling or grinding the exposed first surface 276 of the first wafer section 270 of FIG. 14A. Other alternative embodiments are to adjust the width of the beam members by adjusting the spatial separation between the U-shaped channel 286 and the bar-shaped channel 288 of FIG. 16A, or to adjust the length of the beam members by adjusting the width of the etched channels 266, 286, 288 as shown in FIG. 16A and FIG. 16B. The preferred embodiment for forming torsion beam members 400, as shown in FIG. 1A, is, with reference to FIG. 16A and FIG. 16B, by positioning the bar-shaped channel 288 across the open top of the U-shaped channel 286, centering the bar-shaped channel 288 within the outside dimension of the U-shaped channel 286, extending the length of the bar-shaped channel 288 to equal the entire outside width of the top of the U-shaped channel 286, and spatially separating the ends of the bar-shaped channel 288 from the top of the U-shaped channel 286. An alternative embodiment is the forming of cantilever beam members 410, as shown in FIG. 1B. With reference to FIG. 18, the cantilever beam members are formed by positioning the bar-shaped channel 288 across the open top of the U-shaped channel 286, centering the bar-shaped channel 288 within the inside dimension of the U-shaped channel 286, extending the length of the bar-shaped channel 288 to be less than the inside width of the top of the U-shaped channel 286, and spatially separating the ends of the bar-shaped channel 288 from the inside top of the U-shaped channel 286.

An alternative embodiment for electrically connecting first wafer section 270 and second wafer section 250, is to deposit a conductive material, preferably polysilicon, on the side walls of the U-shaped channel 286, the frame shaped channel 266 and the bar shaped channel 288 after stripping the exposed silicon dioxide layer 260 within these areas.

An alternative embodiment for detecting movement of the inertial mass 300 by fixing piezoresistive elements 420 to the beam members 410 requires a simple first cover plate structure 600 and a simple second cover plate structure 700, both of an insulating material such as glass to be bonded to the silicon support structure 200, as shown in FIG. 7. The piezoresistive elements are then electrically connected to suitable resistance measuring circuitry to determine the amount of twisting or bending of the beam members due to movement of the inertial mass in response to acceleration.

Figure 19:
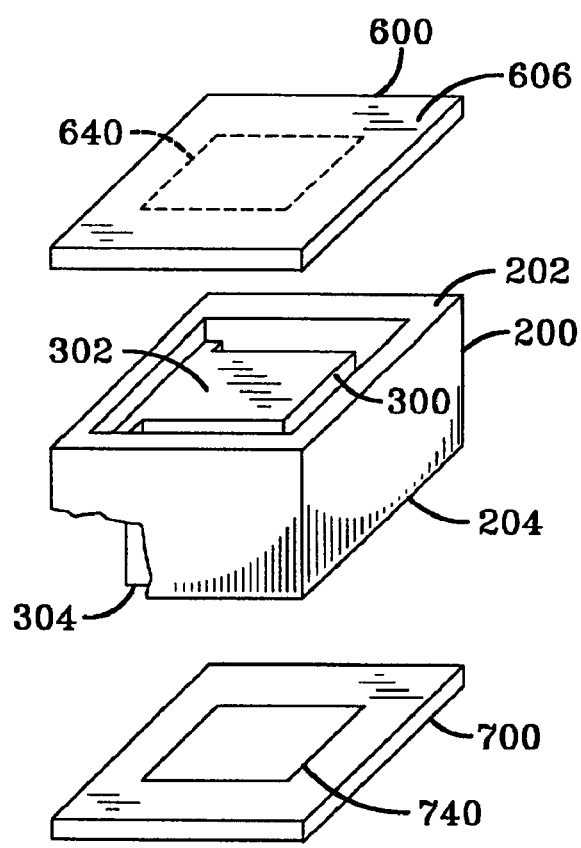
FIG. 19 illustrates the attachment of cover plate structures to the silicon support structure.

The third step of the preferred embodiment of the invention is fabrication the first cover plate structure 600 and second cover plate structure 700 and bonding the cover plate structures to the silicon support structure 200 as shown in FIG. 19. The preferred embodiment for detecting movement of the inertial mass is by measuring two variable capacitances. The first variable capacitance is between the first surface 302 of the inertial mass 300 and a first metallic layer 640 fixed to a first cover plate structure 600 that is insulated from and fixed to the silicon support structure 200. The second variable capacitance is between the second surface 304 of the inertial mass 300 and a second metallic layer 740 fixed to a second cover plate structure 700 that is insulated from and fixed to the silicon support structure 200. The first cover plate structure 600 is a mirror image of the second cover plate structure 700 as shown in FIG. 19, so for brevity, only the fabrication of the first cover plate structure will be described.

Figure 20A:
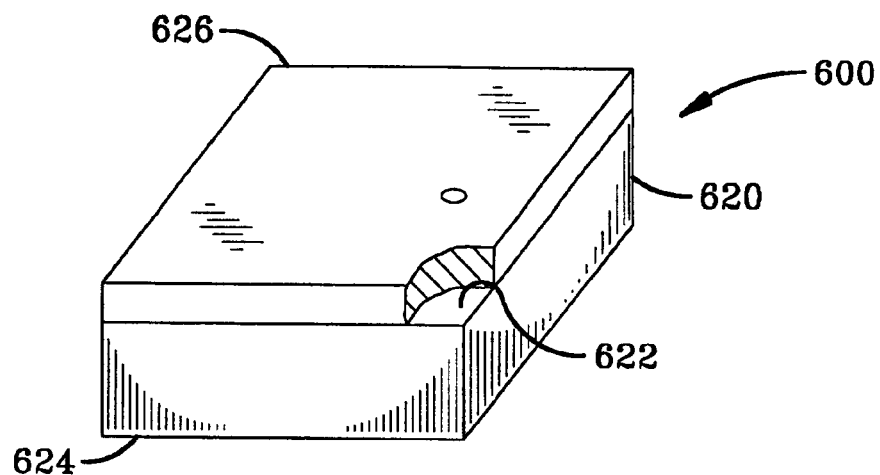
FIG. 20A illustrates a perspective view partially formed cover plate structure showing a wafer section with a silicon dioxide layer.
Figure 20B:
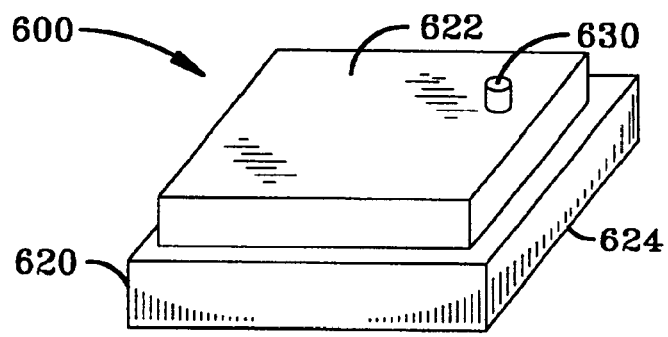
FIG. 20B illustrates a perspective view partially formed cover plate structure showing a trenched wafer section with a silicon mesa.

Referring to FIG. 20A, the preferred embodiment for fabricating the first cover plate structure 600 is by growing a first layer of silicon dioxide 626 on an exposed first surface 622 of an electrically conductive third wafer section 620, the third wafer section 620 having a second surface 624 opposite the first surface 622. The first layer of silicon dioxide 626 on the third wafer section 620 is masked so that the silicon dioxide surface is exposed except for a small shaped pattern that is positioned to coincide with the location of the inertial mass, as shown in FIG. 20A. The exposed silicon dioxide layer 626 is stripped to expose the silicon of the first surface 622 of the third wafer section 620 except for the masked shaped pattern. The exposed silicon surface is etched to a depth of typically 75 microns so that a small silicon mesa 630 is formed on the first surface 622 of the third wafer section 620 as shown in FIG. 20B. Trenches are then formed in a rectangular crosshatched pattern on the first surface 622 of the third wafer section 620 to a depth of typically half the thickness of the third wafer section 620, or about 200 microns. The rectangular crosshatch contains a silicon mesa and is positioned to coincide with the position of the inertial mass, as shown in FIG. 20B.

Figure 21:
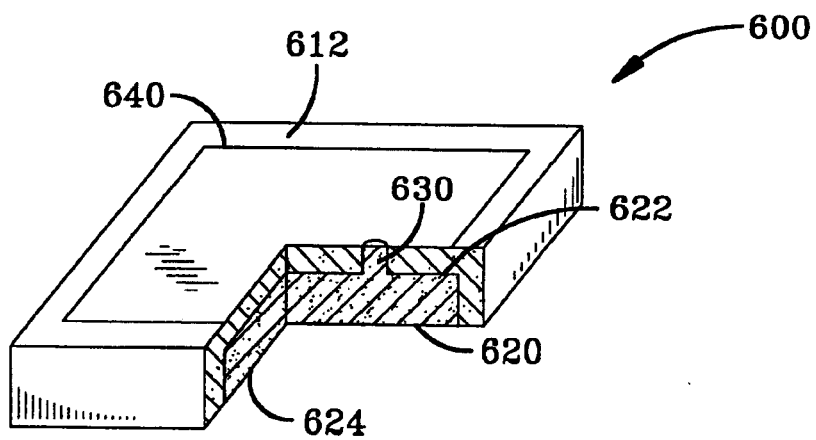
FIG. 21 illustrates partially broken away perspective view of the preferred embodiment of a cover plate structure.

FIG. 21 is a partially broken away perspective of the first cover plate structure 600 that depicts the trenched third wafer section 620 after a layer of glass is melted over the first surface 622 of the third wafer section 620 such that the trenches are filled with glass and the silicon mesa 630 is covered with glass. The glass surface is ground flat forming a planar glass surface 612 having the top of the mesa 630 exposed, and the second surface 624 of the third wafer section is back ground so that the glass-filled trenches are exposed, as shown in FIG. 21. A first metallic rectangular pattern layer 640 is formed on the planar glass surface 612 of the first cover plate structure so that the metallic layer 640 is electrically connected to the opposite electrically conductive third wafer section 620 and its second surface 624 by the electrically conductive silicon mesa 630. The first metallic layer 640 is positioned and sized to coincide with the first surface 302 of the inertial mass 300 shown in FIG. 19.

Figure 22:
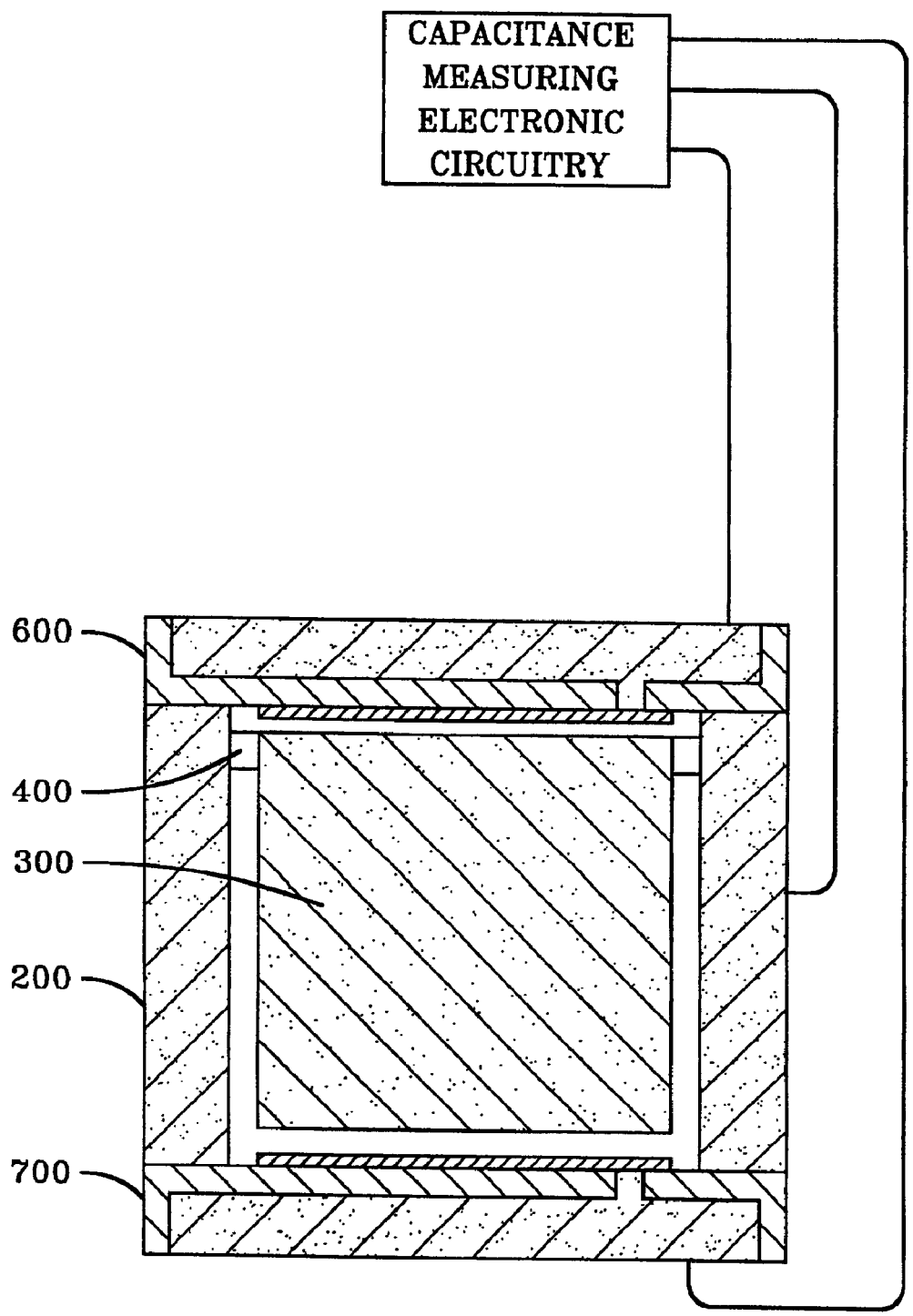
FIG. 22 illustrates a sectional view of a monolithic silicon acceleration sensor having a single sensor cell connected to capacitance measuring circuitry.

The glass surface 612 of the first cover plate structure 600 shown in FIG. 21 is bonded to the first surface 202 of the silicon support structure 200 shown in FIG. 19, so that the first metallic layer 640 is coincident with and spaced from the first surface 302 of the inertial mass 300, such that a first variable capacitor is formed between the first surface 302 and the first metallic layer 640 as shown in FIG. 19. Similarly, the second cover plate structure 700 is bonded to the second surface 204 of the silicon support structure 200 such that a second variable capacitor is formed between the second surface 304 of the inertial mass and the second metallic layer 740 as shown in FIG. 19. Electrical bonding pads 870 are formed on the second surface 624 of the third wafer section 620, on the surface of the silicon support structure 200, and on the second surface 724 of the fourth wafer section 720, as shown in FIG. 6. Electrical lead wires 880 connect the first cover plate structure 600, silicon support structure 200, and second cover plate structure 700 shown in FIG. 6 to electronic circuitry for measuring the value of the first variable capacitor and the value of the second variable capacitor, providing a measurement of the movement of the inertial mass 300 which is an indication of the acceleration magnitude and direction experienced by the sensor. FIG. 22 shows a cross section of a monolithic silicon acceleration sensor having a single sensor cell connected to capacitance measuring electronic circuitry.

Another embodiment in fabricating an alternate first cover plate structure 650 is forming a small hole 666 in a section of electrically insulating material 660 having a first surface 662 and a second surface 664 as shown in FIG. 8, such that the hole coincides with the location of an inertial mass. The surface of the hole 666 is metallized as well as a first rectangular metallic layer 668 on the second surface 664 of the insulating material 660, such that the rectangular metallic layer 668 on the second surface 664 is electrically connected to the first surface by the metallized hole and is positioned and sized to coincide with a first surface of an inertial mass. A electrical bonding pad 870 is formed on the first surface 662 of the insulating material 660 in electrical contact with the metallized hole 666. The second surface 664 of the insulating material 660 is bonded to the first surface of the silicon support structure such that the metallized layer 668 is coincident with and spaced from the first surface of the inertial mass whereby a first variable capacitor is formed. A second cover plate structure is similarly formed and bonded to the second surface of the silicon support structure.

It was noted above that monolithic acceleration sensors having more than one sensor may be manufactured by the method described above by merely changing the angular orientation of the beam members with respect to each other. FIG. 5 shows a monolithic acceleration sensor 110 having a first and a second acceleration sensor cell, whereby the second sensor cell having an inertial mass 320 is oriented at a 180 degree angle from the first sensor cell having an inertial mass 340, when viewing the first surface of the inertial masses, using the beam members as an angular reference. FIG. 4A and FIG. 4B show alternatives of a monolithic acceleration sensor 120, 130 having a first, a second, and a third acceleration sensor cell, whereby the second sensor cell having an inertial mass 310 is oriented at a 90 degree angle from the first sensor cell having an inertial mass 340 and the third sensor cell having an inertial mass 320 is oriented at a 180 degree angle from the first sensor cell having an inertial mass 340, when viewing the first surface of the inertial masses, using the beam members as an angular reference. FIG. 2 shows a monolithic acceleration sensor 140 having a first, a second, a third, and a fourth acceleration sensor cell, whereby the second sensor cell having an inertial mass 310 is oriented at a 90 degree angle from the first sensor cell having an inertial mass 340, the third sensor cell having an inertial mass 320 is oriented at a 180 degree angle from the first sensor cell having an inertial mass 340, and the fourth sensor cell having an inertial mass 330 is oriented at a 270 degree angle from the first sensor cell having an inertial mass 340, when viewing the first surface of the inertial masses, using the beam members as an angular reference.

Although the present invention has been described in considerable detail with reference to certain preferred versions thereof, other versions are possible. It should be understood that the embodiments described herein are merely exemplary and that many alternate embodiments and additional embodiments will become apparent to those skilled in the art. Accordingly such alternative embodiments are to be construed as being within the spirit of the present invention even though not explicitly set forth herein, the present invention being limited only by the content and scope of claims appended hereto.

What is claimed is:

1. A method of manufacturing a monolithic silicon acceleration sensor comprising the step of forming at least one silicon acceleration sensor cell, the step of forming a sensor cell comprising the steps of:
   (a) forming a layered sandwich of an etch-stop layer between a first wafer section of electrically conductive silicon having an exposed first surface and a second wafer section of electrically conductive silicon having an exposed second surface;
   (b) forming a second section of a movable silicon inertial mass by etching a rectangular frame-shaped channel in the second wafer section of silicon from the exposed second surface extending to the etch-stop layer;
   (c) forming a first section of the movable silicon inertial mass by etching a U-shaped channel and a bar-shaped channel in the first wafer section of silicon from the exposed first surface extending to the etch-stop layer, positioning the bar-shaped channel and the U-shaped channel in the first wafer section of silicon to be in horizontal alignment with, and of equal planar dimensions to the rectangular frame-shaped channel in the second wafer section of silicon;
   (d) stripping the etch-stop layer that is exposed by the etched frame-shaped channel, the etched U-shaped channel, and the etched bar-shaped channel, thereby creating a rectangular parallel piped-shaped inertial mass having a first and a second exposed surface, the parallel piped-shaped inertial mass positioned by beam members fixed to a silicon support structure having a first and a second exposed surface; and
   (e) providing a means for detecting movement of the parallel piped-shaped inertial mass.

2. The method of manufacturing a monolithic silicon acceleration sensor according to claim 1, wherein the step of forming the layered sandwich comprises the steps of:
   (a) growing a layer of silicon dioxide on one surface of the first silicon wafer section; and
   (b) bonding the second silicon wafer section to a surface of the silicon dioxide layer.

3. The method of manufacturing a monolithic silicon acceleration sensor according to claim 1, wherein the step of forming the layered sandwich comprises the steps of:
   (a) growing a layer of silicon dioxide on one surface of the first silicon wafer section;
   (b) implanting ions below a surface of the silicon dioxide layer into the first silicon wafer section;
   (c) bonding the second silicon wafer section to the surface of the silicon dioxide layer; and
   (d) thermally shocking the resulting structure such that the first silicon wafer section is caused to be cleaved along a junction of the ion implantation and the remaining silicon of the first silicon wafer section.

4. The method of manufacturing a monolithic silicon acceleration sensor according to claim 1, wherein the step of forming the layered sandwich comprises the steps of:
   (a) growing a layer of silicon dioxide on one surface of the silicon wafer section;
   (b) exposing a small area of the silicon wafer section through the silicon dioxide layer;
   (c) thermally creating a puddle of molten silicon; and
   (d) drawing the puddle of molten silicon onto the exposed surface of the silicon dioxide layer from the exposed area of the silicon wafer section such that the second wafer section of silicon is formed on the silicon dioxide layer when the molten silicon cools.

5. The method of manufacturing a monolithic silicon acceleration sensor according to claim 1, wherein the step of forming the layered sandwich further comprises:
   (a) creating a multiplicity of electrical interconnection paths between the first wafer section of silicon and the second wafer section of silicon through the etch-stop layer; and (b) patterning the interconnection paths in such a way that they will not interfere with any subsequent etching steps.

6. The method of manufacturing a monolithic silicon acceleration sensor according to claim 5, wherein the step of creating a multiplicity of electrical interconnection paths comprises the steps of:
   (a) forming a multiplicity of small holes in the either the first wafer section of silicon or the second wafer section of silicon, extending to the etch-stop layer;
   (b) removing the etch-stop layer exposed at a bottom of the small holes;
   (c) depositing a conductive material such as polysilicon in the small holes, so that electrical connection is made between the first silicon wafer section and the second silicon wafer section through the small holes.

7. The method of manufacturing a monolithic silicon acceleration sensor according to claim 5, wherein the step of creating a multiplicity of electrical interconnection paths comprises the steps of:
   (a) forming a multiplicity of small holes in either the first wafer section of silicon or in the second wafer section of silicon, extending to the etch-stop layer;
   (b) removing the etch-stop layer exposed at a bottom of the small holes; and
   (c) metallizing the surfaces of the holes, so that electrical connection is made between the first and second silicon wafer sections through the small metallized holes.

8. The method of manufacturing a monolithic silicon acceleration sensor according to claim 1, wherein the step of forming the layered sandwich comprises the steps of:
   (a) growing dots of silicon nitride on a first surface of the second silicon wafer section in a pattern such that the dots will not interfere with any subsequent etching operations;
   (b) growing a first layer of silicon dioxide on the remaining exposed silicon on the first surface of the second silicon wafer section;
   (c) stripping off the first silicon dioxide layer so that a depression is formed in the first surface of the second silicon wafer section relative to the interface between the second silicon wafer section and the dots of silicon nitride, thereby forming silicon mesas beneath the silicon nitride dots;
   (d) growing a second silicon dioxide layer in the formed depression extending to a level corresponding to the interface between the silicon mesas and the silicon nitride dots;
   (e) stripping off the silicon nitride dots such that a planar surface is formed by the second silicon dioxide layer interspersed with silicon mesa tops;
   (f) bonding the first silicon wafer section to the formed planar surface of the second silicon dioxide interspersed with the silicon mesa tops, such that the layered sandwich is formed where the first and second silicon wafer sections are electrically interconnected through the second silicon dioxide layer via the mesas of silicon; and
   (g) adjusting a thickness of the first silicon wafer to correspond to a desired thickness of the beam members by grinding off the first silicon wafer section.

9. The method of manufacturing a monolithic silicon acceleration sensor according to claim 1, wherein:
   (a) the step of forming the second section of the inertial mass is by dry etching the rectangular frame-shaped channel in the second wafer section of silicon extending from the exposed second surface to the etch-stop layer, the rectangular frame-shaped channel having a major and a minor dimension; and
   (b) the step of forming the first section of the inertial mass comprises the steps of dry etching a U-shaped channel and the bar-shaped channel having a long dimension in the first wafer section of silicon, the U-shaped channel and the bar-shaped channel each extending from the exposed first surface to the etch-stop layer, the long dimension of the bar-shaped channel is aligned with the major dimension of the rectangular frame-shaped channel in the second wafer section of silicon, thus providing the capability of increasing the inertial mass by an increase in the major dimension without changing an inertial balance in the plane normal to the major dimension.

10. The method of manufacturing a monolithic silicon acceleration sensor according to claim 1, wherein the step of forming the second section of the inertial mass is by dry etching a square frame-shaped channel extending from the exposed second surface to the etch-stop layer, the square frame-shape channel having inside dimensions substantially equal to a thickness of the layered sandwich, so that a cube shaped inertial mass positioned by the beam members is formed.

11. The method of manufacturing a monolithic silicon acceleration sensor according to claim 1, further comprising the steps of:
   (f) adjusting a thickness of the beam members by adjusting the thickness the first wafer section of silicon;
   (g) adjusting a width of the beam members by adjusting a spatial separation between the U-shaped channel and the bar-shaped channel; and
   (h) adjusting a length of the beam members by adjusting a width of the etched channels.

12. The method of manufacturing a monolithic silicon acceleration sensor according to claim 11, wherein the step of adjusting the thickness of the beam members is performed by epitaxially growing silicon onto the exposed first surface of the first wafer section of silicon to a desired thickness.

13. The method of manufacturing a monolithic silicon acceleration sensor according to claim 11, wherein the step of adjusting the thickness of the beam members is performed by milling the exposed first surface of the first wafer section of silicon to a desired thickness.

14. The method of manufacturing a monolithic silicon acceleration sensor according to claim 1, wherein:
   (a) the step of forming the second section of the inertial mass further comprises creating a rectangular second depression on the exposed second surface of the second wafer section of silicon prior to etching the rectangular frame-shaped channel within the second depression; and
   (b) the step of forming the first section of the inertial mass further comprises creating a rectangular first depression on the exposed first surface of the first wafer section of silicon prior to etching the U-shaped channel and the bar-shaped channel within the first depression.

15. The method of manufacturing of a monolithic silicon acceleration sensor according to claim 14, wherein the step of creating the rectangular first depression and the rectangular second depression comprises the steps of:
   (a) growing a first layer of silicon nitride on the exposed first surface of the first wafer section of silicon and a second layer of silicon nitride on the exposed second surface of the second wafer section of silicon;

(b) masking the first silicon nitride layer and the second silicon nitride layer thereby providing a first and a second exposed rectangular area for the rectangular depressions on the first layer of silicon nitride and on the second layer of silicon nitride;

(c) positioning the first and the second rectangular areas to be in horizontal alignment with each other;

(d) stripping the exposed first and second rectangular areas of silicon nitride so that the first and second rectangular areas are exposed on the first wafer section of silicon and on the second wafer section of silicon, respectively;

(e) growing a layer of silicon dioxide on the exposed first and second rectangular areas of silicon;

(f) removing masking on the silicon nitride layers, thereby leaving exposed silicon nitride; and (g) stripping the exposed silicon nitride and the exposed silicon dioxide from the first and the second silicon wafer sections.

16. The method of manufacturing of a monolithic silicon acceleration sensor according to claim 1, wherein the step of forming the first section of the inertial mass comprises the steps of:

(a) positioning the bar-shaped channel across an open top of the U-shaped channel and centering the bar-shaped channel within an outside dimension of the open top of the U-shaped channel;

(b) extending a length of the bar-shaped channel to equal an entire outside width of the open top of the U-shaped channel; and (c) spatially separating the ends of the bar-shaped channel from the open top of the U-shaped channel, so that the inertial mass is positioned by torsion beam members.

17. The method of manufacturing a monolithic silicon acceleration sensor according to claim 1, wherein the step of forming the first section of the inertial mass comprises the steps of:

(a) positioning the bar-shaped channel across an open top of the U-shaped channel and centering the bar-shaped channel within an inside dimension of the open top of the U-shaped channel;

(b) extending a length of the bar-shaped channel to be less than an inside width of the open top of the U-shaped channel; and (c) spatially separating the ends of the bar-shaped channel from the inside open top of the U-shaped channel, so that the silicon inertial mass is positioned by cantilever beam members.

18. The method of manufacturing a monolithic silicon acceleration sensor according to claim 1, wherein the step of providing the means to detect movement of the inertial mass comprises the steps of:

(a) measuring a capacitance between the first surface of the inertial mass and a first electrically conductive layer spaced from the first surface of the inertial mass, insulated from and fixed to the silicon support structure; and (b) measuring a capacitance between the second surface of the inertial mass and a second electrically conductive layer spaced from the second surface of the inertial mass, insulated from and fixed to the silicon support structure.

19. The method of manufacturing a monolithic silicon acceleration sensor according to claim 1, wherein the step of providing the means to detect movement of the inertial mass comprises the steps of:

(a) growing a first layer of silicon dioxide on an exposed first surface of an electrically conductive third wafer section of silicon and a first layer of silicon dioxide on an exposed first surface of an electrically conductive fourth wafer section of silicon, the third and fourth silicon wafer sections having a second surface opposite the exposed first surface;

(b) masking the first silicon dioxide layer on the third and on the fourth silicon wafer sections so that a silicon dioxide surface on at least one of the first silicon dioxide layer on the third and on the fourth silicon wafer sections is exposed except for a small post-shaped pattern such that the post-shaped pattern is positioned to coincide with the location of the inertial mass;

(c) stripping the silicon dioxide layer from the exposed silicon dioxide surfaces so that exposed areas of silicon are formed except for the post-shaped pattern of the masked silicon dioxide on the first surface of the third and the fourth silicon wafer sections;

(d) etching the exposed areas of the third and the fourth silicon wafer sections to a depth of about 75 microns so that a small mesa of silicon is formed on the first surface of the third silicon wafer section beneath the post-shaped pattern and on the first surface of the fourth silicon wafer section beneath the post-shaped pattern;

(e) forming trenches on the first surface of the third and the fourth silicon wafer sections in a rectangular cross-hatched pattern to a depth of about half of the third and fourth silicon wafer section thickness such that an enclosed rectangle contains at lease one silicon mesa and is positioned to coincide with a position of the inertial mass;

(f) melting a layer of glass over the first surface of the third and the fourth silicon wafer sections having the silicon mesa and trenches, such that the trenches are filled with the glass and the silicon mesas are covered with the glass;

(g) grinding the glass flat so that a planar glass surface is formed on the first surface of the third and the fourth silicon wafer sections, the planar glass surface having a silicon mesa pattern exposed;

(h) back grinding the second surface of the third and the fourth silicon wafer sections so that the glass-filled trenches are exposed and electrical isolation is formed within the rectangular crosshatched pattern, thereby forming a first cover plate structure from the third silicon wafer section and a second cover plate structure from the fourth silicon wafer section;

(i) metallizing a rectangular pattern layer on the glass first surface of the first and second cover plate structures so that the metallic layer is electrically connected to the opposite silicon surface by the silicon mesa, and sized and positioned to coincide with the first and second surfaces of the inertial mass;

(j) bonding the glass surface of the first cover plate structure to the first surface of the silicon support structure so that the metallized rectangular pattern layer is coincident with and spaced from the first surface of the inertial mass whereby a first variable capacitor is formed;

(k) bonding the glass surface of the second cover plate structure to the second surface of the silicon support structure so that the metallized rectangular pattern layer is coincident with and spaced from the second surface of the inertial mass whereby a second variable capacitor is formed; and (l) providing means for electrical connecting the silicon wafer section of the first cover plate structure, the silicon support structure, and the silicon wafer section of the second cover plate structure to electronic circuitry for measuring the value of the first variable capacitor and the value of the second variable capacitor.

20. The method of manufacturing a monolithic silicon acceleration sensor according to claim 1, wherein the step of providing the means to detect movement of the inertial mass comprises the steps of:

(a) forming a small hole in a first glass layer and in a second glass layer at positions that coincide with the locations of the inertial mass, each glass layer having a first surface and a second surface;

(b) metallizing a surface of the small hole;

(c) metallizing a first rectangular layer on the first surface of the first glass layer and on the first surface of the second glass layer so that each metallic rectangular layer is electrically connected to the opposite second surface of the first and second glass layers by the metallized hole, and the metallic layers being sized and positioned to coincide with the first and second surfaces of the inertial mass;

(d) metallizing an electrical bonding pad on the second surface of the first and second glass layers so that each bonding pad is electrically connected to the corresponding rectangular metallic layer on the first surface of the first and second glass layers by the metallized holes;

(e) bonding the first surface of the first glass layer to the first surface of the silicon support structure so that the metallized rectangular layer is coincident with and spaced from the first surface of the inertial mass whereby a first variable capacitor is formed;

(f) bonding the first surface of the second glass layer to the second surface of the silicon support structure so that the metallized rectangular layer is coincident with and spaced from the second surface of the inertial mass whereby a second variable capacitor is formed; and (g) providing means for electrical connecting the electrical bonding pad on the first glass layer, the silicon support structure, and the electrical bonding pad on the second glass layer to electronic circuitry for measuring the value of the first variable capacitor and the value of the second variable capacitor.

21. The method of manufacturing a monolithic silicon acceleration sensor according to claim 1, wherein the step of providing the means to detect movement of the inertial mass comprises the steps of:

(a) attaching piezoresistive elements to the beam members; and (b) providing electrical connections from the piezoresistive elements to resistance measuring circuitry to determine an amount of twisting or bending of the beam members due to movement of the inertial mass in response to acceleration.

22. The method of manufacturing a monolithic silicon acceleration sensor according to claim 1, further comprising the step of electrically interconnecting the first and second wafer sections of silicon by depositing a layer of conductive polysilicon over the surface of the etched structure, following the step of stripping the etch-stop.

23. The method of manufacturing a monolithic silicon acceleration sensor according to claim 1, further comprising the step of forming a single monolithic silicon acceleration sensor cell for sensing planar acceleration.

24. The method of manufacturing a monolithic silicon acceleration sensor according to claim 1, further comprising the steps of:

(a) forming the monolithic sensor comprising a first and a second silicon acceleration sensor cell for sensing two axes acceleration; and (b) orienting the second sensor cell at a 90 degree or a 180 degree angle to the first sensor cell when viewing the first surface of the inertial masses, using the beam members as an angular reference.

25. The method of manufacturing a monolithic silicon acceleration sensor according to claim 1, further comprising the steps of:

(a) forming the monolithic sensor comprising a first, second, and a third silicon acceleration sensor cell for sensing three axes acceleration;

(b) orienting the second sensor cell at a 90 degree angle to the first sensor cell when viewing the first surface of the inertial masses, using the beam members as an angular reference; and (c) orienting the third sensor cell at a 180 degree angle to the first sensor cell when viewing the first surface of the inertial masses, using the beam members as an angular reference.

26. The method of manufacturing a monolithic silicon acceleration sensor according to claim 1, further comprising the steps of:

(a) forming the monolithic comprising a first, second, third and a fourth silicon acceleration sensor cell for sensing three axes acceleration;

(b) orienting the second sensor cell at a 90 degree angle to the first sensor cell when viewing the first surface of the inertial masses, using the beam members as an angular reference;

(c) orienting the third sensor cell at a 180 degree angle to the first sensor cell when viewing the first surface of the inertial masses, using the beam members as an angular reference; and (d) orienting the fourth sensor cell at a 270 degree angle to the first sensor cell when viewing the first surface of the inertial masses, using the beam members as an angular reference.

* * * * *

UNITED STATES PATENT AND TRADEMARK OFFICE
CERTIFICATE OF CORRECTION

PATENT NO. : 6,862,795 B2 Page 1 of 1
DATED : March 8, 2005
INVENTOR(S) : Geoffrey L. Mahon It is certified that error appears in the above-identified patent and that said Letters Patent is hereby corrected as shown below:

<u>Title page,</u>
Item [73], Assignee, should read -- VTI Holding Oy, Vantaa (FI) --

Signed and Sealed this

Twenty-sixth Day of July, 2005

JON W. DUDAS
*Director of the United States Patent and Trademark Office*